(12) United States Patent
Xu et al.

(10) Patent No.: US 10,585,637 B2
(45) Date of Patent: Mar. 10, 2020

(54) INFORMATION PROCESSING METHOD AND ELECTRONIC DEVICE

(71) Applicant: Lenovo (Beijing) Co., Ltd., Beijing (CN)

(72) Inventors: Wei Xu, Beijing (CN); Maogang Chen, Beijing (CN); Yaqiang Wu, Beijing (CN); Yingwen Luo, Beijing (CN); Mingxiang Cai, Beijing (CN); Xilong Zhou, Beijing (CN); Baoli Liu, Beijing (CN); Bin Li, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 45 days.

(21) Appl. No.: 15/936,844

(22) Filed: Mar. 27, 2018

(65) Prior Publication Data

US 2018/0275948 A1 Sep. 27, 2018

(30) Foreign Application Priority Data

Mar. 27, 2017 (CN) .......................... 2017 1 0189060
Mar. 27, 2017 (CN) .......................... 2017 1 0190172

(51) Int. Cl.

| | |
|---|---|
| *G06F 3/14* | (2006.01) |
| *G09G 5/12* | (2006.01) |
| *H04W 76/14* | (2018.01) |
| *G09G 5/10* | (2006.01) |
| *G06F 1/3234* | (2019.01) |

(52) U.S. Cl.
CPC .......... *G06F 3/1454* (2013.01); *G06F 1/3265* (2013.01); *G06F 3/1462* (2013.01); *G09G 5/10* (2013.01); *G09G 5/12* (2013.01); *H04W 76/14* (2018.02); *G09G 2320/0626* (2013.01); *G09G 2320/0686* (2013.01); *G09G 2330/021* (2013.01); *G09G 2354/00* (2013.01); *G09G 2358/00* (2013.01); *G09G 2360/04* (2013.01); *G09G 2370/04* (2013.01); *G09G 2370/06* (2013.01); *G09G 2370/16* (2013.01)

(58) Field of Classification Search
CPC ............ G06F 3/1454–1462; G06F 3/041–047; G09G 5/12; G09G 2370/06; G09G 2370/16
USPC ................................... 345/2.2–2.3
See application file for complete search history.

(56) References Cited

U.S. PATENT DOCUMENTS

| | | | |
|---|---|---|---|
| 9,600,223 B2 * | 3/2017 | Kim ...................... | G06F 3/1454 |
| 2010/0060549 A1 * | 3/2010 | Tsern .................... | G06F 3/1415 |
| | | | 345/2.1 |
| 2012/0139847 A1 | 6/2012 | Hunt | |

(Continued)

FOREIGN PATENT DOCUMENTS

| | | |
|---|---|---|
| CN | 103870224 A | 6/2014 |
| CN | 104185001 A | 12/2014 |

(Continued)

*Primary Examiner* — Michael Pervan
(74) *Attorney, Agent, or Firm* — Anova Law Group, PLLC

(57) ABSTRACT

An information processing method includes sending, by a first electronic device, content displayed on the first electronic device to a second electronic device through a communication connection between the first electronic device and the second electronic device; detecting operation instruction information; and determining a display state of the first electronic device based at least on the operation instruction information.

18 Claims, 11 Drawing Sheets

(56) References Cited

U.S. PATENT DOCUMENTS

| | | | |
|---|---|---|---|
| 2013/0222229 A1* | 8/2013 | Kanda | G06F 3/1454 345/156 |
| 2013/0278484 A1* | 10/2013 | Hwang | G06F 3/1423 345/2.3 |
| 2013/0282847 A1 | 10/2013 | Bhat et al. | |
| 2014/0358981 A1* | 12/2014 | Miyake | H04L 67/1095 709/201 |
| 2014/0359493 A1* | 12/2014 | Hong | G06F 3/1454 715/761 |
| 2015/0070247 A1* | 3/2015 | Kasahara | H04N 21/4222 345/1.1 |
| 2015/0106866 A1* | 4/2015 | Fujita | H04N 21/4126 725/133 |
| 2015/0109262 A1* | 4/2015 | Nagao | G06F 3/038 345/178 |
| 2015/0154781 A1* | 6/2015 | Takanashi | G01C 21/3697 345/629 |
| 2016/0098099 A1* | 4/2016 | Cho | G06F 3/03547 345/157 |
| 2016/0216852 A1* | 7/2016 | Lee | G06F 3/04817 |
| 2016/0253142 A1* | 9/2016 | Choi | G06F 3/1423 345/1.3 |
| 2016/0253144 A1* | 9/2016 | Huang | G06F 3/1462 345/2.2 |
| 2016/0266863 A1* | 9/2016 | Song | G06F 3/04817 |
| 2016/0349946 A1* | 12/2016 | Koh | G06F 3/0488 |
| 2017/0024031 A1* | 1/2017 | Ueda | G06F 3/0488 |
| 2017/0069255 A1* | 3/2017 | Honkanen | G06F 3/04883 |
| 2017/0220309 A1* | 8/2017 | Kato | G09G 5/391 |
| 2017/0351531 A1* | 12/2017 | Li | G06F 9/452 |
| 2018/0070389 A1* | 3/2018 | Morgan | G06F 9/452 |
| 2019/0026064 A1* | 1/2019 | Jeon | G06F 3/14 |
| 2019/0034153 A1* | 1/2019 | Robinson | G06F 3/1454 |

FOREIGN PATENT DOCUMENTS

| | | |
|---|---|---|
| CN | 104346119 A | 2/2015 |
| CN | 105068750 A | 11/2015 |
| CN | 105607264 A | 5/2016 |
| CN | 106055327 A | 10/2016 |
| CN | 106095237 A | 11/2016 |
| CN | 106161763 A | 11/2016 |

* cited by examiner

INFORMATION PROCESSING METHOD AND ELECTRONIC DEVICE

CROSS-REFERENCES TO RELATED APPLICATIONS

This application claims priority to Chinese Patent Application No. 201710189060.6, filed on Mar. 27, 2017, and Chinese Patent Application No. 201710190172.3, filed on Mar. 27, 2017, the entire contents of both of which are incorporated herein by reference.

TECHNICAL FIELD

The present disclosure relates to the field of terminal management technology and, more particularly, to an information processing method and an electronic device.

BACKGROUND

In some implementations of the existing electronic devices, two electronic devices can be connected and can interact with each other. In one scenario, a connection can be established between two electronic devices, such as a mobile phone and a laptop computer. The interface of the mobile phone can be cast to the screen of the laptop computer. By controlling the laptop computer, the contents of the interface of the mobile phone can be operated. The response results of the operation can be also cast to the screen of the laptop computer.

However, in such scenario, the display states of the two electronic devices cannot be adjusted based on the response results of the operation.

SUMMARY

In accordance with the disclosure, there is provided an information processing method including sending, by a first electronic device, content displayed on the first electronic device to a second electronic device through a communication connection between the first electronic device and the second electronic device; detecting operation instruction information; and determining a display state of the first electronic device based at least on the operation instruction information.

Also in accordance with the disclosure, there is provided an information processing method including receiving content currently displayed on a first electronic device through a communication connection between the first electronic device and a second electronic device; displaying, by the second electronic device, the content in a sub-region of a display screen of the second electronic device; and, in response to detecting operation instruction information directed to the sub-region, determining a display state of the second electronic device.

Also in accordance with the disclosure, there is provided an electronic device including a connecting circuit, a detector coupled to the connecting circuit, and a controller coupled to the detector. The connecting circuit establishes a communication connection between the electronic device and another electronic device and sends content displayed on the electronic device to the another electronic device through the communication connection. The detector detects operation instruction information. The controller determines a display state of the electronic device based at least on the operation instruction information.

BRIEF DESCRIPTION OF THE DRAWINGS

Various objectives, features, and advantages of the present disclosure can be more fully appreciated with the detailed description of embodiments in connection with the following drawings, in which same reference numerals refer to the same or like elements unless otherwise specified. The following drawings are merely examples for illustrative purposes according to various disclosed embodiments and are not intended to limit the scope of the present disclosure.

DETAILED DESCRIPTION

Embodiments of the disclosure will be described in detail with reference to the accompanying drawings. The following description is made only by way of example, but does not limit the present disclosure. Various embodiments of the present disclosure and various features in the embodiments that do not conflict with each other can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

In accordance with various embodiments, the present disclosure provides an information processing method, a first electronic device, and a second electronic device.

Figure 1:
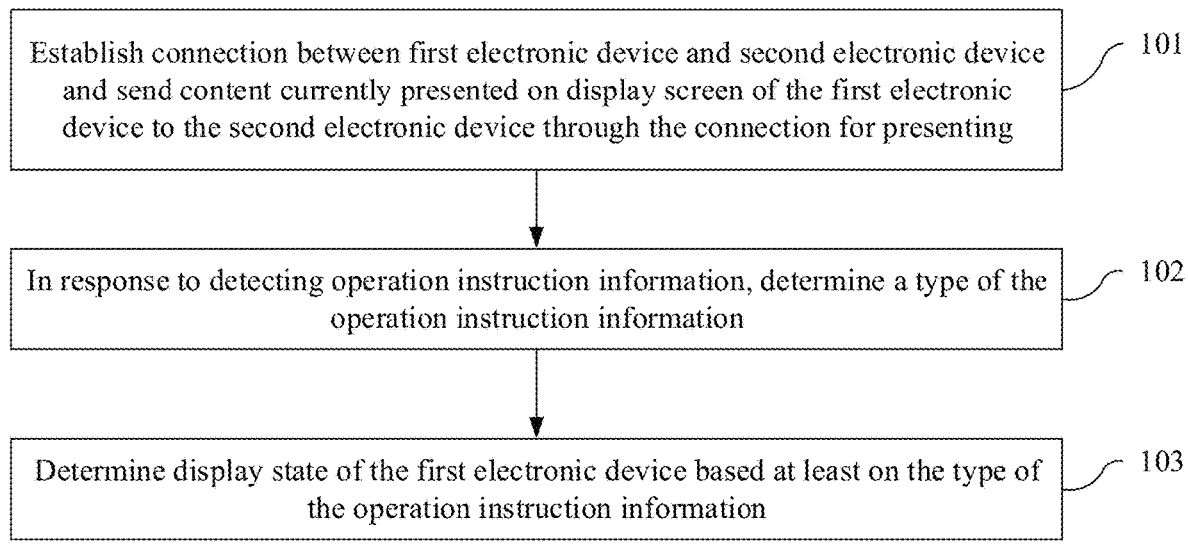
FIG. 1 illustrates a schematic flow diagram of an example of method for processing information that is implemented on a first electronic device in accordance with the present disclosure.

FIG. 1 illustrates a schematic flow diagram of an example of method for processing information that is implemented on a first electronic device in accordance with the present disclosure.

At 101, a connection between the first electronic device and a second electronic device is established. The content currently presented on the display screen of the first electronic device is sent to the second electronic device through the connection for presenting.

At 102, in response to detecting operation instruction information, a type of the operation instruction information is determined. The type of the operation instruction information can include at least one of a first type of operation instruction information from the first electronic device or a second type of operation instruction information from the second electronic device.

At 103, a display state of the first electronic device is determined based at least on the type of the operation instruction information.

In some embodiments, the first electronic device may be, for example, a mobile phone, a tablet, or a wearable device. The second electronic device may be an electronic device having a display screen larger than the display screen of the first electronic device, such as, for example, a personal computer, a laptop, a desktop, or a tablet.

An area of the display screen of the second electronic device is larger than an area of the display screen of the first electronic device. In order to enlarge the display of the first electronic device, and to monitor the current state of the first electronic device on the display screen of the second electronic device, a communication connection can be established between the first electronic device and the second electronic device, and the content displayed on the display screen of the first electronic device can be cast to the larger screen of the second electronic device.

In some embodiments, a cross screen application, also referred to as a "screen sharing application," can be operated on the second electronic device. The cross screen application can capture one or more application running on the first electronic device, and/or application interfaces of the front desk application of the first electronic device. The captured content can be displayed in a cross screen window, also referred to as a "screen sharing window," of the cross screen application on the display screen of the second electronic device. The cross screen window refers to an application window of the cross screen application.

In some embodiments, the connection established between the second electronic device and the first electronic device at 101 may be a wireless connection, such as a Bluetooth connection, a WIFI connection, etc. In some other embodiments, the connection established between the second electronic device and the first electronic device at 101 may be a connection via a data line.

Figure 2:
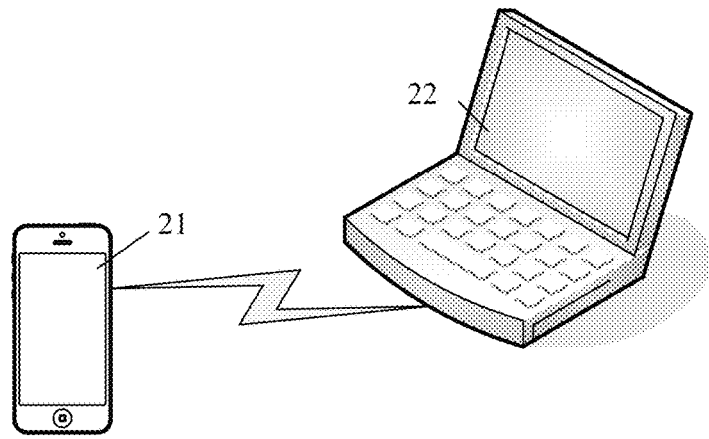
FIG. 2 illustrates a schematic diagram of an example of scenario for implementing a method for processing information in accordance with the present disclosure.

FIG. 2 illustrates a schematic diagram of an example of scenario for implementing a method for processing information in accordance with the present disclosure. As shown, a mobile phone 21 is connected with a laptop computer 22 through a WIFI connection.

In some embodiments, all content currently displayed in the display region of the first electronic device can be processed to obtain image information. The image information can be sent to the second electronic device through the connection for presenting.

There are two manners to present the content on the display screen of the second electronic device. In a first manner, the content can be display in a full screen of the display screen of the second electronic device. In a second manner, the content can be display in a sub-region of the display screen of the second electronic device.

Figure 3A:
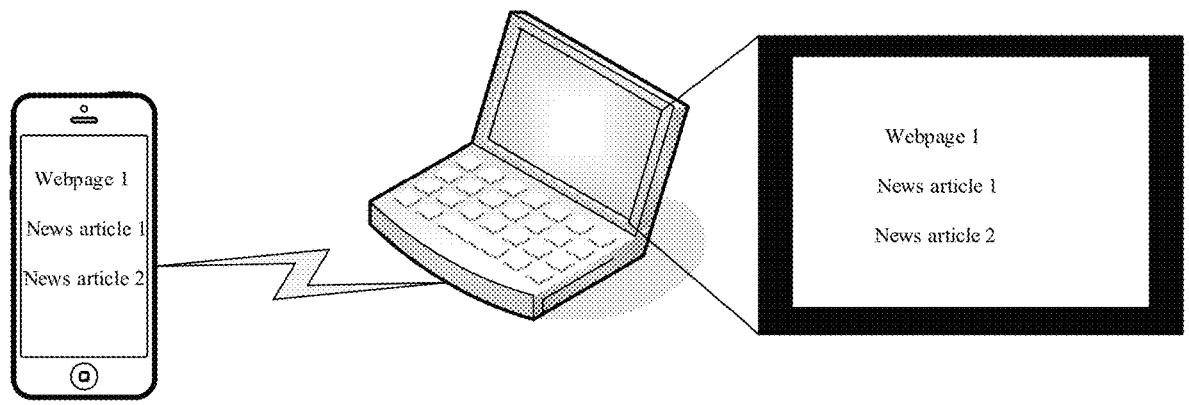
FIG. 3a illustrates a schematic diagram of another example of scenario for implementing a method for processing information in accordance with the present disclosure.
Figure 3B:
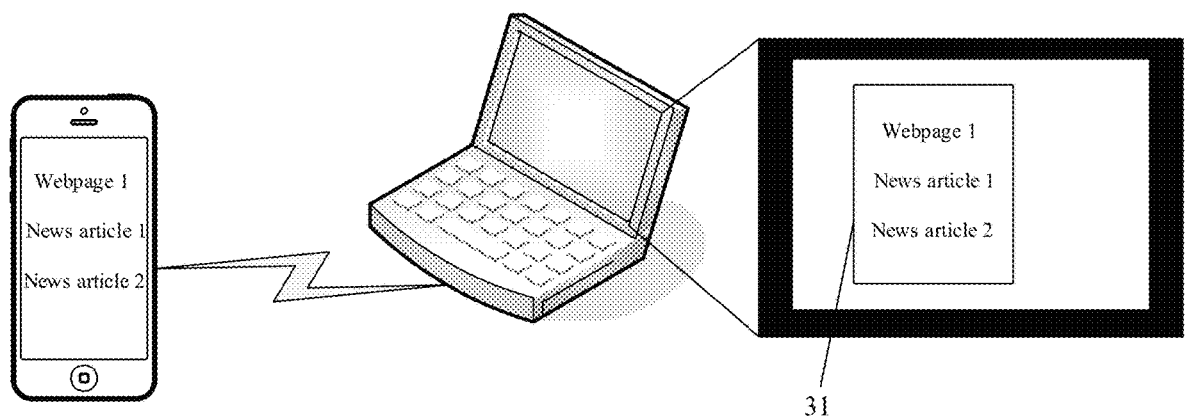
FIG. 3b illustrates a schematic diagram of another example of scenario for implementing a method for processing information in accordance with the present disclosure.

FIG. 3*a* illustrates a schematic diagram of one example of scenario for implementing a method for processing information in accordance with the present disclosure. FIG. 3*b* illustrates a schematic diagram of another example of scenario for implementing a method for processing information in accordance with the present disclosure.

As shown in FIG. 3*a*, the screen interface of the mobile phone is presented in a full screen on the display screen of the laptop computer. As shown in FIG. 3*b*, the screen interface of the mobile phone is presented in a sub-region 31 of the display screen of the laptop computer.

It is noted that, the sub-region can be flexibly configured, or can be fixedly configured. For example, the sub-region can be dragged by the user for flexible changes. As another example, the sub-region can be configured in a fixed size at a certain location of the display screen of the second electronic device.

In some implementations, the first electronic device and the second electronic device can display same information. When the first electronic device and the second electronic device perform cooperative operations, the information may not be desirably confidential.

In some embodiments, determining the type of the operation instruction information at 102 can include the following processes.

In response to detecting the operation instruction information by using an input detector of the first electronic device, the type of the operation instruction information can be determined to be the first type of operation instruction information.

In response to obtaining the operation instruction information through the connection from the second electronic device, the type of the operation instruction information can be determined to be the second type of operation instruction information.

Figure 4:
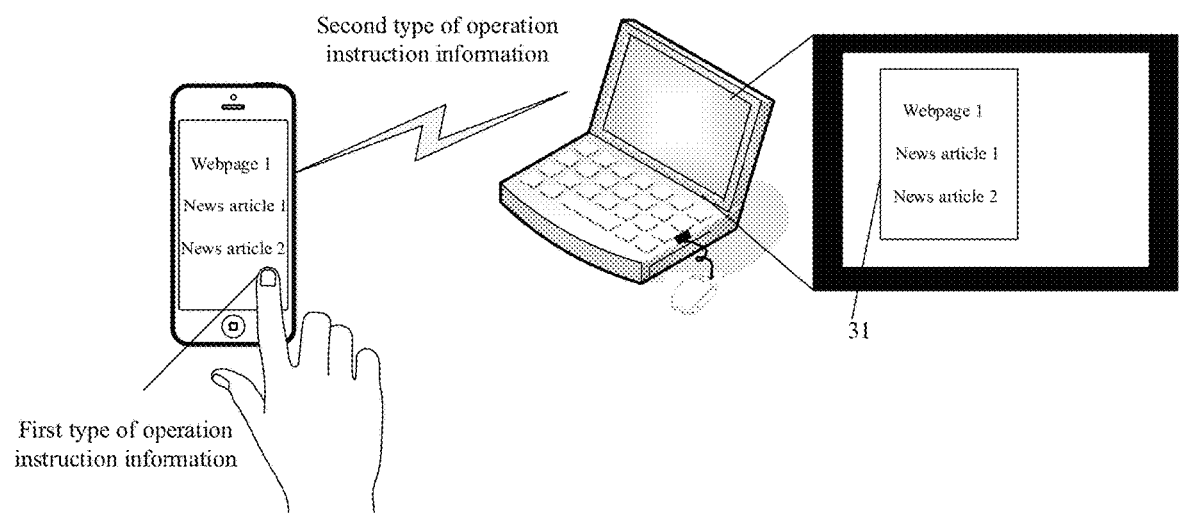
FIG. 4 illustrates a schematic diagram of another example of scenario for implementing a method for processing information in accordance with the present disclosure.

FIG. 4 illustrates a schematic diagram of another example of scenario for implementing a method for processing information in accordance with the present disclosure.

In some embodiments, the input detector of the first electronic device may include a touch screen, a physical button, etc. For example, as shown in FIG. 4, in response to detecting that a user touches the touch screen, it is determined that the operation instruction information detected by the input detector is the first type of operation instruction information.

In some embodiments, obtaining the operation instruction information through the connection from the second electronic device can include obtaining an operation instruction through an external device or a button of the second electronic device that can receive operation instructions from a user. For example, as shown in FIG. 4, in response to detecting a mouse clicking at a position of the display screen of the second electronic device, or in response to detecting a mouse clicking in the sub-region of the display screen of the second electronic device that presents the content currently displayed on the display screen of the first electronic device, it is determined that the operation instruction information obtained is the second type of operation instruction information.

In some embodiments, determining the display state of the first electronic device based at least on the type of the operation instruction information at 103 can include the following processes.

In response to determining that the type of the operation instruction information is the first type of operation instruction information, the displaying of the content on the display screen of the first electronic device can be controlled based on a first display parameter.

In response to determining that the type of the operation instruction information is the second type of operation instruction information, the displaying of the content on the display screen of the first electronic device can be controlled based on a second display parameter.

A power consumption for displaying the content on the display screen of the first electronic device based on the first display parameter can be larger than a power consumption for displaying the content on the display screen of the first electronic device based on the second display parameter.

The display parameter may include the brightness of the display screen. When the brightness of the display screen is high, the power consumption of the displaying of the content on the display screen is also high. When the brightness of the display screen is low, the power consumption of the displaying of the content on the display screen is also low. That is, in response to detecting an operation on the mobile phone side, the brightness of the display screen of the mobile phone can be increased, and in response to detecting an operation on the laptop computer side, the brightness of the display screen of the mobile phone can be decreased.

In some embodiments, the method for processing information can further include the following processes.

In response to detecting that the display screen of the first electronic device is displaying based on the first display parameter, a time length during which no first type of operation instruction information is received can be detected.

In response to determining that the time length during which no first type of operation instruction information is received is greater than a first preset threshold value, the display screen of the first electronic device can be controlled to display based on the second display parameter.

A power consumption displaying the content on the display screen of the first electronic device based on the first display parameter can be larger than a power consumption displaying the content on the display screen of the first electronic device based on the second display parameter.

In some embodiments, if a touch operation on the touch screen of the mobile phone is not received for a time period, and a press operation on a button of the mobile phone is not received for the time period, the brightness of the touch screen of the mobile phone can be decreased. In some other embodiments, if a touch operation on the touch screen of the mobile phone is not received for a time period, the brightness of the touch screen of the mobile phone can be decreased.

Further, in some embodiments, the first display parameter and the second display parameter can correspond to different values of the brightness of the display screen. The values of the brightness of the display screen corresponding to the first display parameter and the second display parameter can be set according to actual situations. For example, the second display parameter can correspond to a minimum value of the brightness of the display screen, or can be correspond to a black screen mode. As another example, the first display parameter can correspond to a value of a normal brightness of the display screen.

Figure 5:
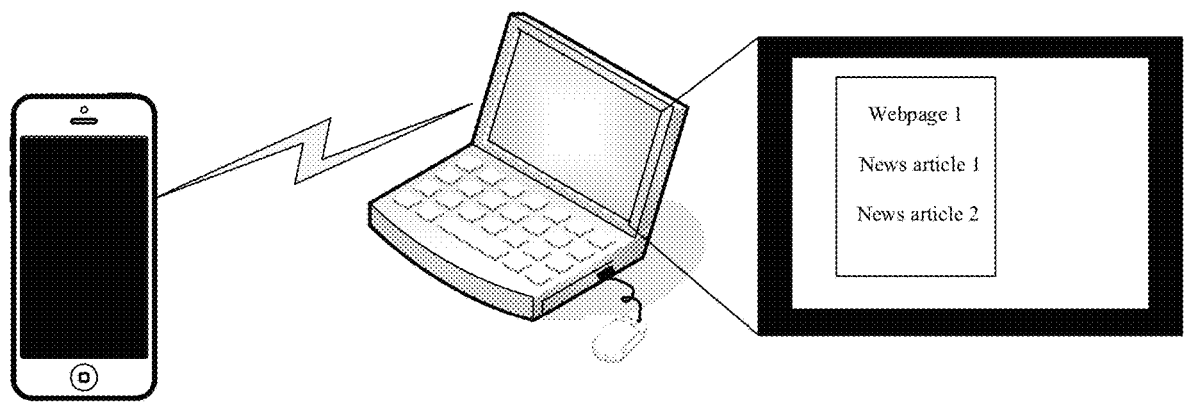
FIG. 5 illustrates a schematic diagram of another example of scenario for implementing a method for processing information in accordance with the present disclosure.

FIG. 5 illustrates a schematic diagram of another example of scenario for implementing a method for processing information in accordance with the present disclosure. When the mobile phone has not detected the first type of operation instruction information for about one minute, the mobile phone can be switched to the black screen mode for saving power consumption.

The first preset threshold value can be set according to actual situations. For example, the first preset threshold value can be set as one minute.

Further, in response to determining that the type of the operation instruction information is the first type of operation instruction information, an adjustment instruction can be transmitted to the second electronic device to adjust the display parameters of the second electronic device to reduce the power consumption of the second electronic device. Alternatively, in response to determining that the type of the operation instruction information is the first type of operation instruction information, an adjustment instruction can be transmitted to the second electronic device to adjust the display parameters of the second electronic device to decrease the brightness of the sub-region of the display screen of the second electronic device.

That is, the adjustment instruction can be used to reduce the brightness of the entire display screen of the second electronic device. It can be set as default that when there is no operation performed on the second electronic device, the power consumption of the entire display screen of the second electronic device can be reduced.

Figure 6:
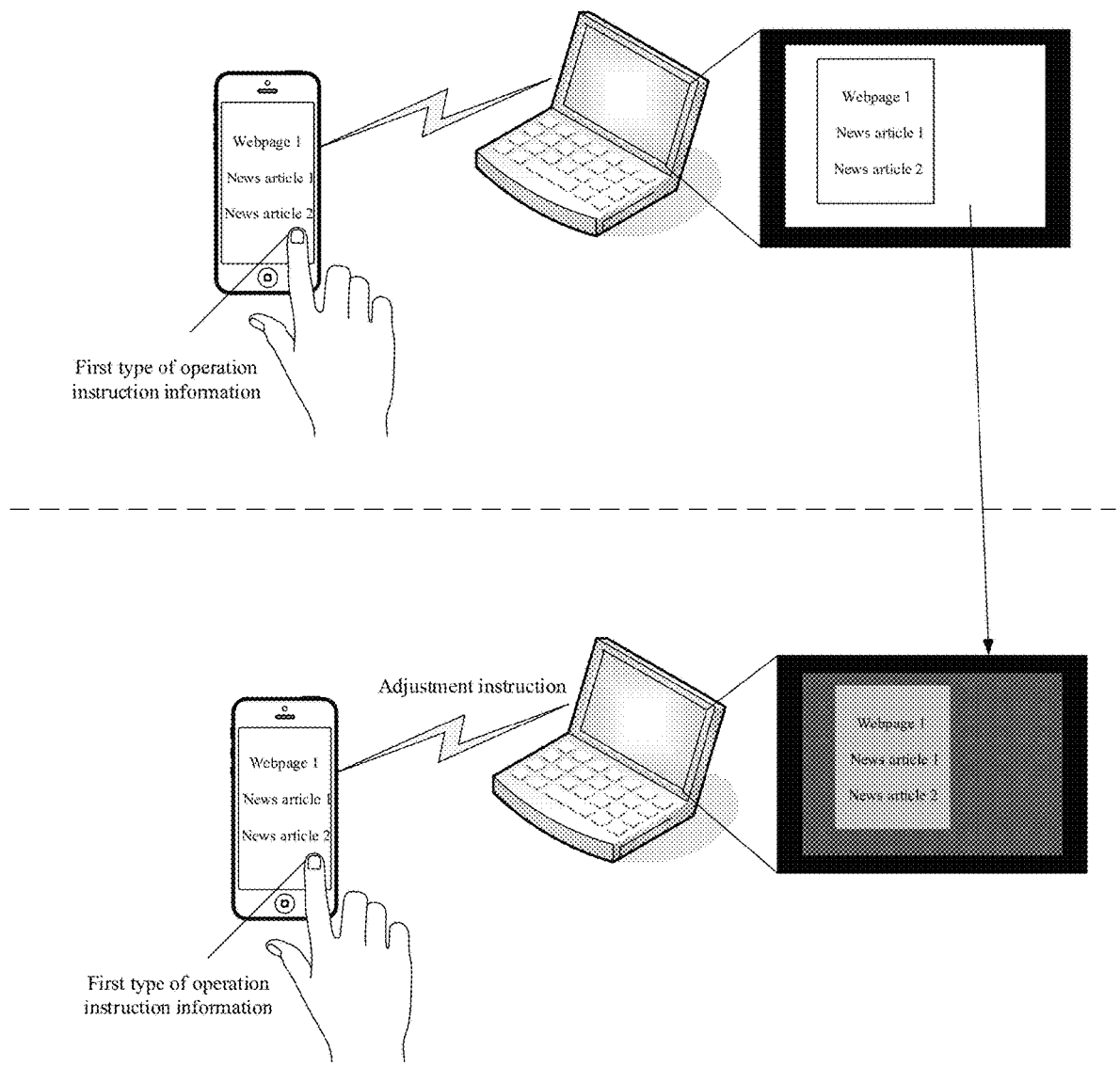
FIG. 6 illustrates a schematic diagram of another example of scenario for implementing a method for processing information in accordance with the present disclosure.

FIG. 6 illustrates a schematic diagram of another example of scenario for implementing a method for processing information in accordance with the present disclosure. As shown, if the user operation instructions are only received from the side of the mobile phone, an adjustment instruction is transmitted to the laptop computer after a certain length of time, such as 30 seconds. The adjustment instruction can control the laptop computer to adjust the brightness of the entire display screen from a higher value as shown in the upper pane to a lower value as shown in the lower pane.

In addition, the adjustment instruction may be used to decrease the brightness of the sub-region of the display screen of the second electronic device. As such, the power consumption of the second electronic device can be partially decreased.

Figure 7:
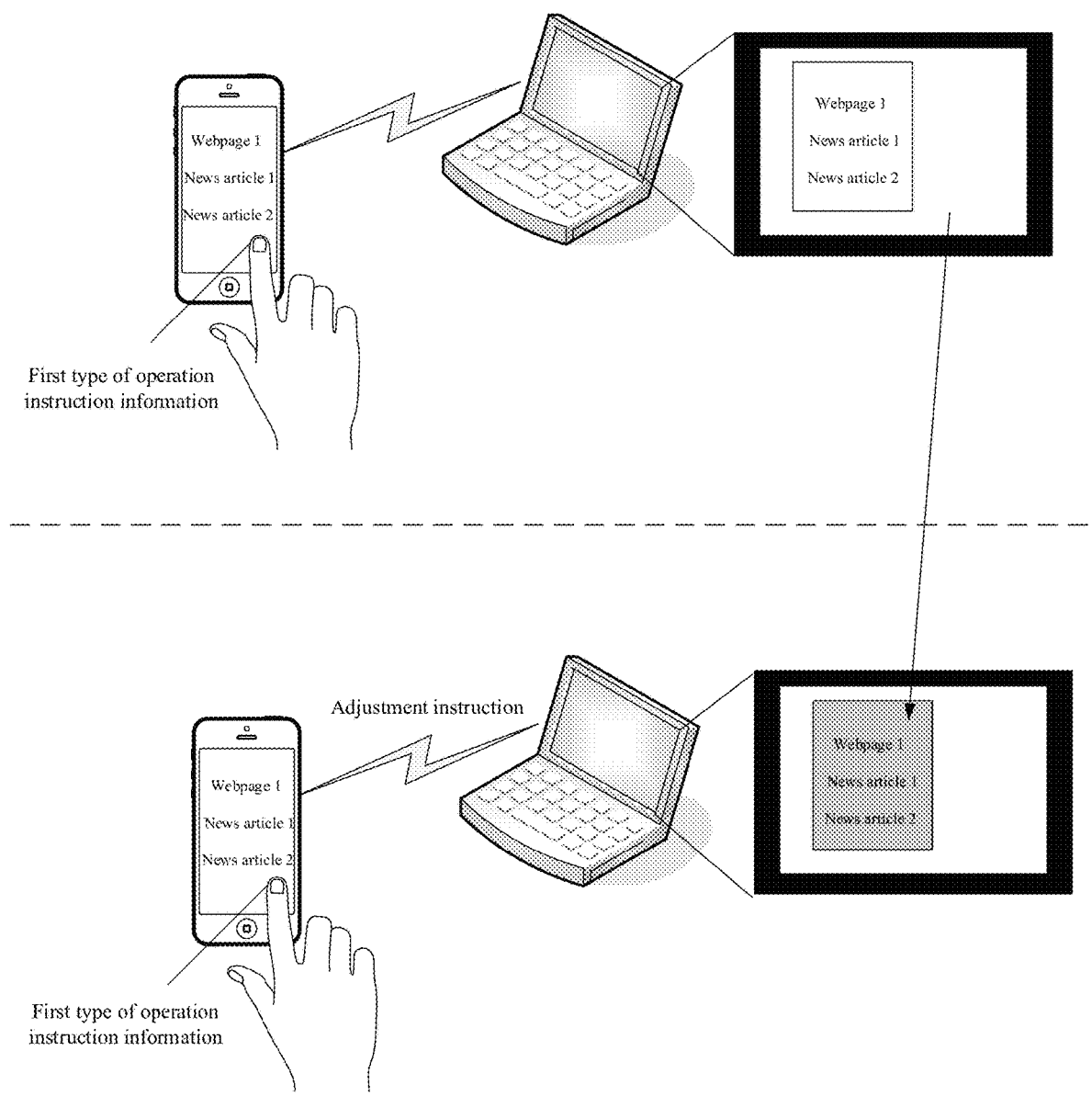
FIG. 7 illustrates a schematic diagram of another example of scenario for implementing a method for processing information in accordance with the present disclosure.

FIG. 7 illustrates a schematic diagram of another example of scenario for implementing a method for processing information in accordance with the present disclosure. As shown, if the user operation instructions are only received from the mobile phone, an adjustment instruction can be transmitted to the laptop computer after a certain length of time, such as 30 seconds. The adjustment instruction can control the laptop computer to adjust the brightness of the sub-region of the display screen from a higher value as shown in the upper pane to a lower value as shown in the lower pane.

In one example of scenario for implementing the method for processing information, the display screen of a mobile phone can be cast to a personal computer, and the mouse and keyboard of the personal computer can control the mobile phone. When the user operations are performed on contents in the sub-region of the display screen of the personal computer, the display screen of the mobile phone can be reduced to a minimum brightness. As such, the power consumption of the mobile phone can be decreased, and it can prevent others from accidentally seeing the user privacy from the display screen of the mobile phone.

When the user touches the display screen of the mobile phone, the display screen of the mobile phone can be lit up, and the sub-region of the display screen of the personal computer can be dimmed after a certain period of time. Further, when the user uses the mouse or keyboard of the personal computer to control the mobile phone, the display screen of the mobile phone can be dimmed to the minimum brightness after a certain period of time, and the sub-region of the display screen of the personal computer can display at a normal brightness.

In some embodiments, when the connection between the first electronic device and the second electronic device is broken, the display screen of the first electronic device can be controlled to display based on the first display parameter. That is, in response to determining that the display screen of the mobile phone is not cast to the personal computer, the display screen of the mobile phone can display at a normal brightness.

Accordingly, by using the disclosed method, a connection can be established between a first electronic device and a second electronic device. The first electronic device and the second electronic device can simultaneously display the content of the first electronic device. Based on the type of the operation instruction received, the first electronic device can determine a display state of the first electronic device. As such, the first electronic device can flexibly adjust the display state according to the current operation status of the first electronic device. Therefore, when both of the first electronic device and the second electronic device are able to display the content of the first electronic device, one of the first electronic device and the second electronic device that does not receive user operation can adjust the display state to reduce the possibility of information disclosure, thereby enhancing the information security for the user.

In some other implementations, when the first electronic device and the second electronic device are simultaneously displaying the content of the first electronic device, in response to receiving a new message by the second electronic device, a message notification may pop up on the display screen of the second electronic device. However, the message notification may be automatically hidden after a certain period of time. If the message notification is only displayed in a cross screen window (e.g., the sub-region of the display screen) of the second electronic device, the message notification may be easily ignored by the user due to non-obviousness. Therefore, the user may not timely review the new message through the display screen of the second electronic device, thereby causing a delayed response to the new message.

In order to avoid the above described problem, determining the type of the operation instruction information at 102 can include the following processes.

In response to receiving the operation instruction information generated by the first electronic device, it can be determined that the type of the operation instruction information is the first type of operation instruction information. The operation instruction information generated by the first electronic device can include a notification generated by the first electronic device.

The second electronic device can receive a message associated with the notification. In some embodiments, the second electronic device can receive the message from the first electronic device. In some other embodiments, the second electronic device can generate the message based on a prompt message sent from the first electronic device.

The notification can be displayed on the second electronic device. The cross screen application can obtain the content displayed on the first electronic device, thus the notification can be displayed in the cross screen window of the cross screen application.

In order to facilitate the user to review the notification on the second electronic device, the second electronic device can obtain a message associated with the notification. The notification can be displayed on the first electronic device or on the second electronic device in a first display mode. The message can be displayed on the second electronic device in a second display mode. The first display mode can be different than the second display mode.

For example, the message can be displayed on the taskbar of the second electronic device. The taskbar may be located at the operation bar of the Windows operating system at the bottom of the display screen. A display time of the message can be generally greater than a display time of the notification. As such, a highlighting effect can be achieved to prompt the user to review the notification and/or content related to the first notification in time through the second electronic device or through the first electronic device.

The notification can indicate that the first electronic device receives information from another electronic device. For example, the notification can indicate that an instant messaging application of the first electronic device receives an instant communication message. The notification may be a system notification of the first electronic device, or an application notification corresponding to an application of the first electronic device.

Figure 8:
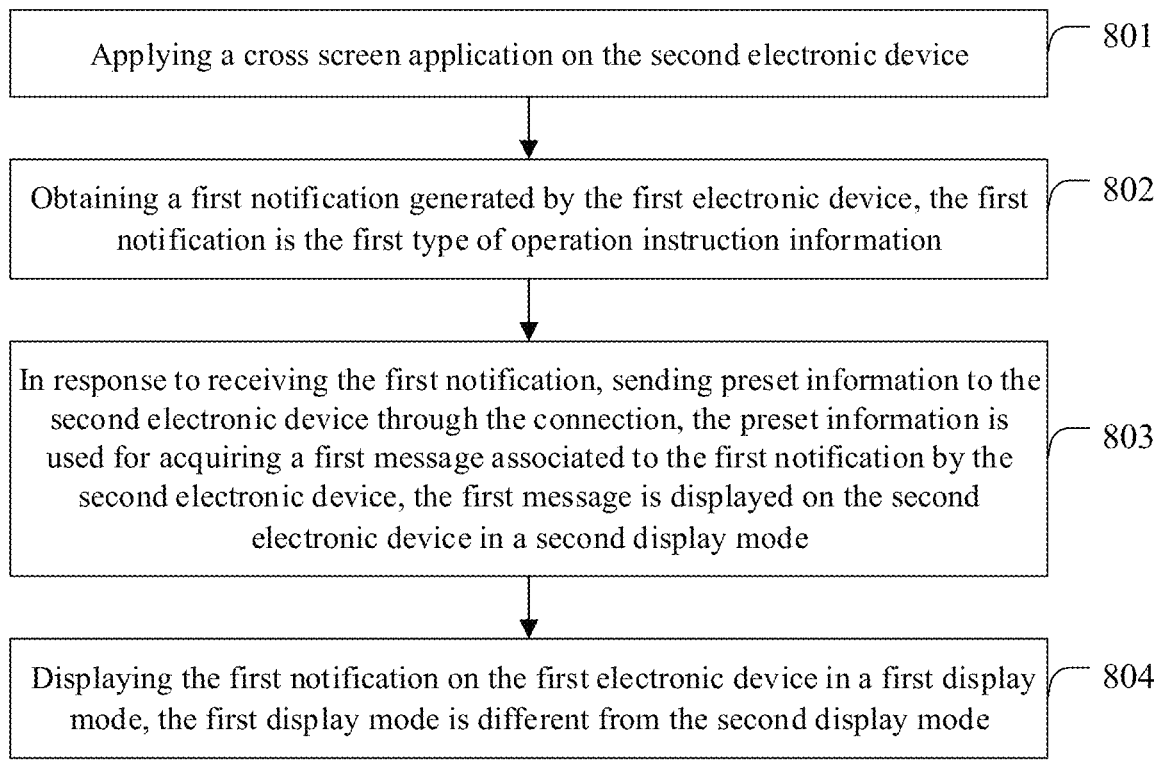
FIG. 8 illustrates a schematic flow diagram of another example of method for processing information that is implemented on the first electronic device in accordance with the present disclosure.

FIG. 8 illustrates a schematic flow diagram of another example of method for processing information that is implemented on a first electronic device in accordance with the present disclosure. As shown, the method include the following processes.

At 801, a connection between the first electronic device and a second electronic device is established, the content displayed on the display screen of the first electronic device can be transmitted to the second electronic device for display. In some embodiments, at 801, a cross screen application is run on the second electronic device.

At 802, a notification generated by the first electronic device is obtained. The notification can be the first type of operation instruction information.

At 803, in response to receiving the notification, preset information is transmitted to the second electronic device through the connection. The preset information can be used for causing the second electronic device to acquire a message associated with the notification. The message can be displayed on the second electronic device in a second display mode.

At 804, the notification is displayed on the first electronic device in a first display mode. The first display mode can be different from the second display mode.

The disclosed method for processing information may be implemented on the first electronic device. The first electronic device can share the content displayed on the display screen.

In some embodiments, a connection between the first electronic device and the second electronic device can be established for conducting cross screen display, also referred to as a "screen sharing display." The content to be displayed by the second electronic device can be displayed in a cross screen window of the cross screen application of the second electronic device.

After the connection between the first electronic device and the second electronic device is established and when the cross screen display is being conducted, in response to receiving the notification, the first electronic device can send preset information to the second electronic device. The preset information can trigger the second electronic device to acquire the message associated with the notification.

The notification can be displayed on the first electronic device and/or the second electronic device in a first display mode. If the notification is displayed on the first electronic device, the notification can be simultaneously displayed in the cross screen window of the second electronic device in the first display mode. The message can be displayed on the second electronic device in a second display mode that is different from the first display mode.

After receiving the notification, the first electronic device can automatically generate preset information, and send the preset information to the second electronic device. The notification can be received by the first electronic device from another devices, such as a server through a network.

In some embodiments, the method for processing information can further include the following processes.

The first electronic device can receive a control command transmitted from the second electronic device when the second electronic device detects a first operation acting on the message.

According to the control command, the first electronic device can start an application corresponding to the notification.

The content of the notification can be displayed within an application interface of the application.

The data of the application interface of the application can be transmitted to the second electronic device. The data of the application interface of the application can be used by the second electronic device to display the application interface of the application in the cross screen window of the cross screen application.

In some embodiments, the message on the second electronic device can be operated by the user. For example, the second electronic device can detect a first operation acting on the message, or a second operation towards the notification. In such cases, the second electronic device can send a control command to the first electronic device.

In response to receiving the control command, the first electronic device can start an application corresponding to the notification in the foreground. The content corresponding to the notification can be displayed in the application interface of the application interface.

The content corresponding to the notification may include the instant message received by the first electronic device, and/or article titles of new articles promoted to the user corresponding to the notification, and/or detailed information of the notification.

In some embodiments, process 803 can include the following processes.

The first electronic device can send a prompt message corresponding to the message to the second electronic device. The prompt message can be used to generate the message by the second electronic device, or can be used to transmit the message to the second electronic device.

The preset information can include the message, and other information and/or data that can trigger the second electronic device to obtain the message.

In the following, some examples are described to demonstrate the implementations of the disclosed method described above.

In one example, a mobile phone is used as the first electronic device, and a personal computer is used as the second electronic device. A display control method can be provided. The display control method can include the following processes.

A cross screen connection can be established between the mobile phone and the personal computer. The cross screen connection can be a communication link between the mobile phone and the personal computer for sharing a display screen. For example, the content displayed on the mobile phone can be displayed on a cross screen window on the personal computer.

In response to receiving a new message notification by the mobile phone, the mobile phone can send prompt information or a message corresponding to the new message notification to the personal computer.

The personal computer can display the message sent by the mobile phone in a region other than the cross screen window. In some other embodiments, the personal computer can generate a message based on the prompt information sent by the mobile phone, and display the generated message in a region other than the cross screen window. The region other than the cross screen window can be a taskbar, etc.

In response to detecting an operation associated with the message by the personal computer, the personal computer can transmit a control command to the mobile phone.

In response to receiving the control command, the mobile phone can start an application corresponding to the control command in the front end, and can display the new message in an application interface of the application.

The user can browse or operate the application in the window of the PC used to display the display screen of the mobile phone. All operations by the user on the cross screen window can be detected and hence the display on the mobile phone can be controlled.

Figure 9:
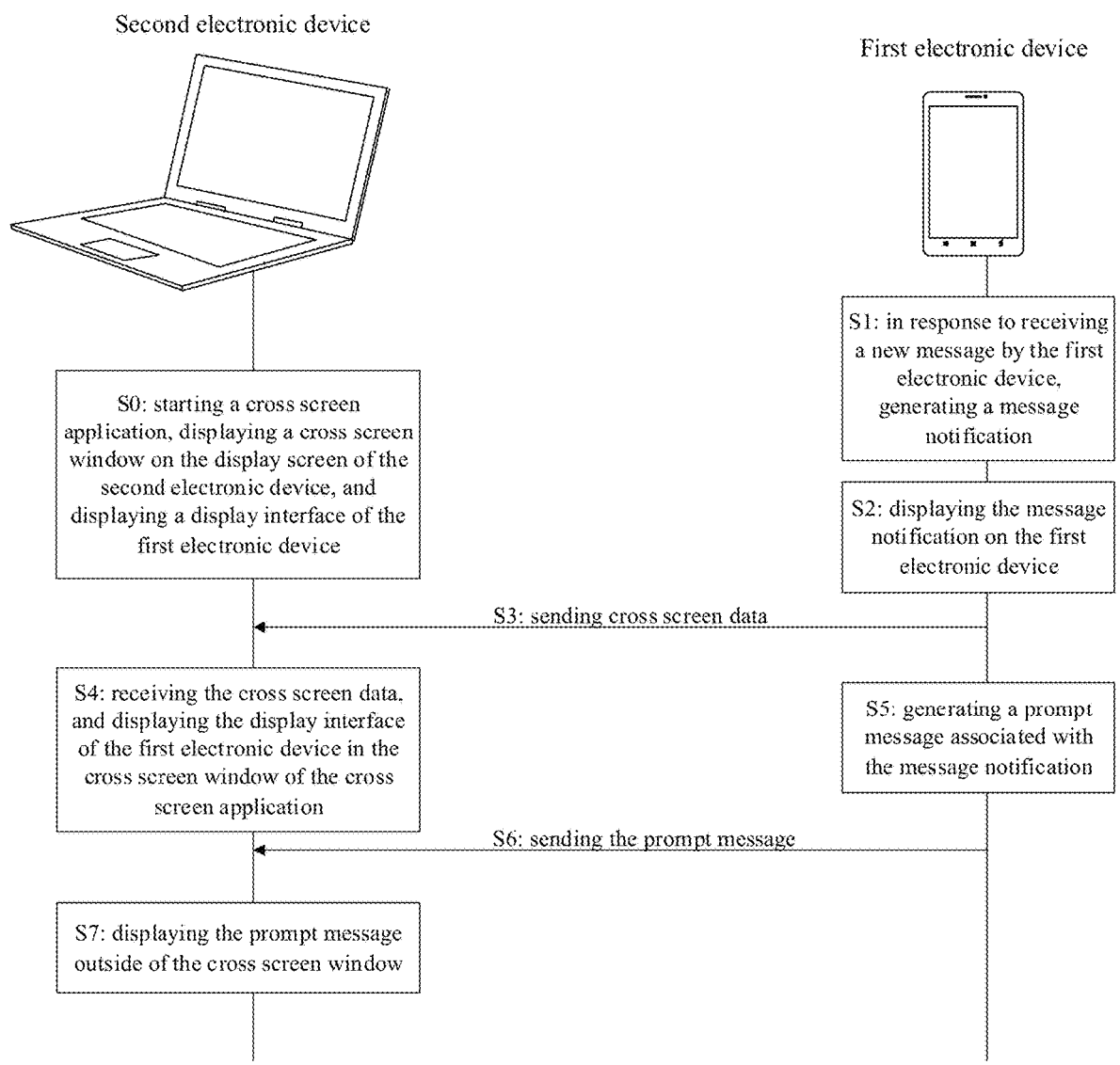
FIG. 9 illustrates a schematic flow diagram of an example of method for processing information in accordance with the present disclosure.

FIG. 9 illustrates a schematic flow diagram of an example of method for processing information that is implemented on a first electronic device and a second electronic device in accordance with the present disclosure. As shown, the method include the following processes.

At S0, the second electronic device, such as a laptop computer, starts a cross screen application, displays a cross screen window on the display screen of the second electronic device, and displays a display interface of a first electronic device in the cross screen window. The cross screen window can be a small window. An area of the small window can be less than an area of the display screen of the second electronic device. In some embodiments, an area of the small window can be larger than an area of the display screen of the first electronic device. The area of the small window can be equal to N times of the area of the display screen of the first electronic device. N can be a real number larger than or equal to one, and smaller than two.

At S1, in response to receiving a new message by the first electronic device, the first electronic device generates a message notification. The message notification can prompt the user to review the new message.

At S2, the message notification is displayed on the first electronic device. For example, the message notification can be displayed on a pull-down menu of the mobile phone. As another example, the message notification can blink on the left side of the lock screen of the mobile phone. That is, the message notification can be displayed for a preset time period. And after the preset time period, the message notification can be hidden. The preset time period can be one second, five seconds, etc.

At S3, the first electronic device sends cross screen data to the second electronic device.

At S4, the second electronic device receives the cross screen data, and displays the display interface of the first electronic device in the cross screen window of the cross screen application. When the first electronic device displays the message notification, the second electronic device also displays the message notification. The message notification can be one type of the notification described above.

At S5, the first electronic device generates a prompt message associated with the message notification. The prompt message can be one type of the notification described above.

At S6, the first electronic device sends the prompt message to the second electronic device.

At S7, the second electronic device displays the prompt message outside the cross screen window.

Compared with the system notifications, the prompt message can be displayed by using different display parameters, such as at a different display location, for a different display duration, etc.

Figure 10:
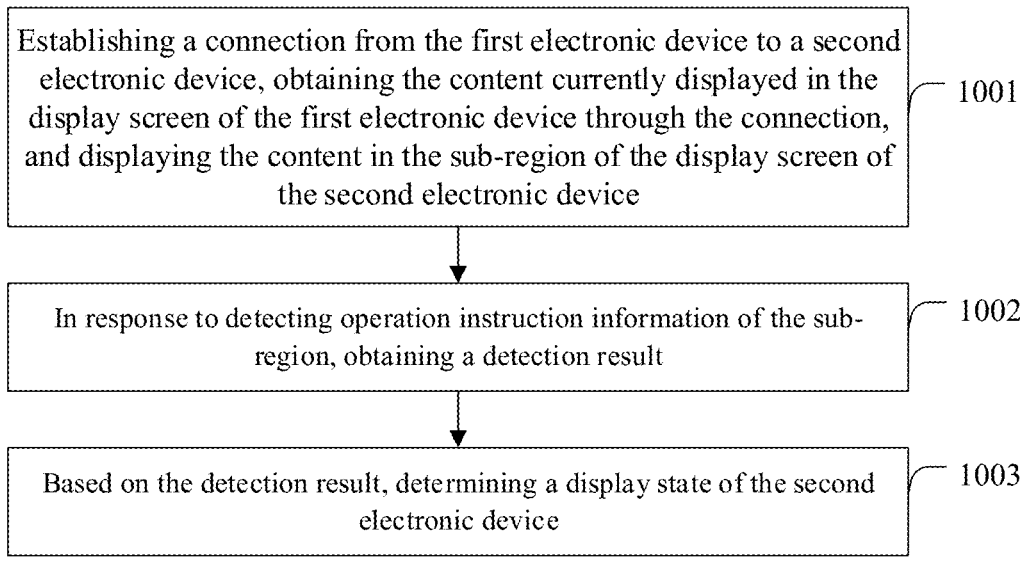
FIG. 10 illustrates a schematic flow diagram of an example of method for processing information that is implemented on a second electronic device in accordance with the present disclosure.

FIG. 10 illustrates a schematic flow diagram of an example of method for processing information that is implemented on a second electronic device in accordance with the present disclosure. As shown, the method include the following processes.

At 1001, a connection between the first electronic device and the second electronic device is established. The content displayed on the display screen of the first electronic can be obtained by the second electronic device through the connection. The content can be displayed on a sub-region of the display screen of the second electronic device.

At 1002, in response to detecting operation instruction information of the sub-region, a detection result is obtained.

At 1003, based on the detection result, a display state of the second electronic device is determined.

In some embodiments, the first electronic device may be, for example, a mobile phone, a tablet, or a wearable device. The second electronic device may be an electronic device having a display screen larger than the display screen of the first electronic device, such as a personal computer, a laptop, a desktop, or a tablet.

An area of the display screen of the second electronic device is larger than an area of the display screen of the first electronic device. In order to enlarge the display of the first electronic device, and to monitor the current state of the first electronic device on the display screen of the second electronic device, a communication connection can be established between the first electronic device and the second electronic device, and the content displayed on the display screen of the first electronic device can be cast to the larger screen of the second electronic device.

In some embodiments, a cross screen application can be run on the second electronic device. The cross screen application can capture one or more applications running on the first electronic device, and/or application interfaces of the front display application of the first electronic device. The captured content can be displayed in a cross screen region of the cross screen application on the display screen of the second electronic device.

In some embodiment, the connection established between the second electronic device and the first electronic device at 1001 may be a wireless connection, such as a Bluetooth connection, a WIFI connection, etc. In some other embodiments, the connection established between the second electronic device and the first electronic device at 1001 may be a connection via a data line.

FIG. 2 illustrates a schematic diagram of an example of scenario for implementing a method for processing information in accordance with the present disclosure. As shown, a mobile phone 21 is connected with a laptop computer 22 through a WIFI connection.

In some embodiments, all content currently displayed in the display region of the first electronic device can be processed to obtain image information. The image information can be sent to the second electronic device through the connection for presenting.

There are two manners to present the content on the display screen of the second electronic device. In a first manner, the content can be display in a full screen of the display screen of the second electronic device. In a second manner, the content can be display in a sub-region of the display screen of the second electronic device.

FIG. 3*a* illustrates a schematic diagram of one example of scenario for implementing a method for processing information in accordance with the present disclosure. FIG. 3*b* illustrates a schematic diagram of another example of scenario for implementing a method for processing information in accordance with the present disclosure.

As shown in FIG. 3*a*, the screen interface of the mobile phone is presented in a full screen on the display screen of the laptop computer. As shown in FIG. 3*b*, the screen interface of the mobile phone is presented in a sub-region 31 of the display screen of the laptop computer.

It is noted that, the sub-region can be flexibly configured, or can be fixedly configured. For example, the sub-region can be dragged by the user for flexible changes. As another example, the sub-region can be configured in a fixed size at a certain location of the display screen of the second electronic device.

In some implementations, the first electronic device and the second electronic device can display same information. When the first electronic device and the second electronic device perform cooperative operations, the information may not be desirably confidential.

In some embodiments, obtaining the detection result for detecting operation instruction information of the sub-region at 1002 can include the following processes.

In some embodiments, whether an operation instruction is received through an external device (external with respect to the second electronic device) is detected. In some other embodiments, in addition to detecting the operation instruction received through the external device, an operation instruction through a physical button of the second electronic device, such as a restart button, can be detected. In some embodiments, detecting the operation instruction information may only include detecting operation instruction information corresponding to an operation performed within the sub-region of the second electronic device.

FIG. 4 illustrates a schematic diagram of another example of scenario for implementing a method for processing information in accordance with the present disclosure.

In some embodiments, the input detector of the first electronic device may include a touch screen, a button, etc. For example, as shown in FIG. 4, in response to detecting that a user touches the touch screen, it is determined that the operation instruction information detected by the input detector is the first type of operation instruction information.

In some embodiments, obtaining the operation instruction information through the connection from the second electronic device can include obtaining an operation instruction through an external device or a button of the second electronic device that can receive operation instructions from a user. For example, as shown in FIG. 4, in response to detecting a mouse clicking at a position of the display screen of the second electronic device, or in response to detecting a mouse clicking in the sub-region of the display screen of the second electronic device that presents the content currently displayed on the display screen of the first electronic device, it is determined that the operation instruction information obtained is the second type of operation instruction information.

In some embodiments, determining the display state of the second electronic device based on the detection result at 1003 can include the following processes.

In response to detecting the operation instruction information, the second electronic device can send the operation instruction information to the first electronic device. As such, the first electronic device can generate an adjustment instruction based on the operation instruction information.

The second electronic device can receive the adjustment instruction transmitted from the first electronic device.

Based on the adjustment instruction, the second electronic device can adjust the display parameter to increase a power consumption of the display screen of the second electronic device.

In some other embodiments, based on the adjustment instruction, the second electronic device can increase the brightness of the sub-region of the display screen used for presenting current content of the first electronic device.

The display parameter may include the brightness of the display screen. When the brightness of the display screen is high, the power consumption of the displaying of the content on the display screen is also high. When the brightness of the display screen is low, the power consumption of the displaying of the content on the display screen is also low. That is, in response to detecting an operation on the mobile phone side, the brightness of the display screen of the mobile phone can be increased, and in response to detecting an operation on the laptop computer side, the brightness of the display screen of the mobile phone can be decreased.

In some embodiments, before detecting the operation instruction information, the second electronic device can have a relatively low power consumption by the display screen.

That is, before detecting the operation instruction information, the second electronic device can display at a low brightness. After detecting the operation instruction information, the second electronic device can increase the brightness of the entire display screen of the second electronic device according to the adjustment command sent from the first electronic device, or can increase the brightness of the sub-region of the display screen of the second electronic device according to the adjustment command sent from the first electronic device.

Figure 11:
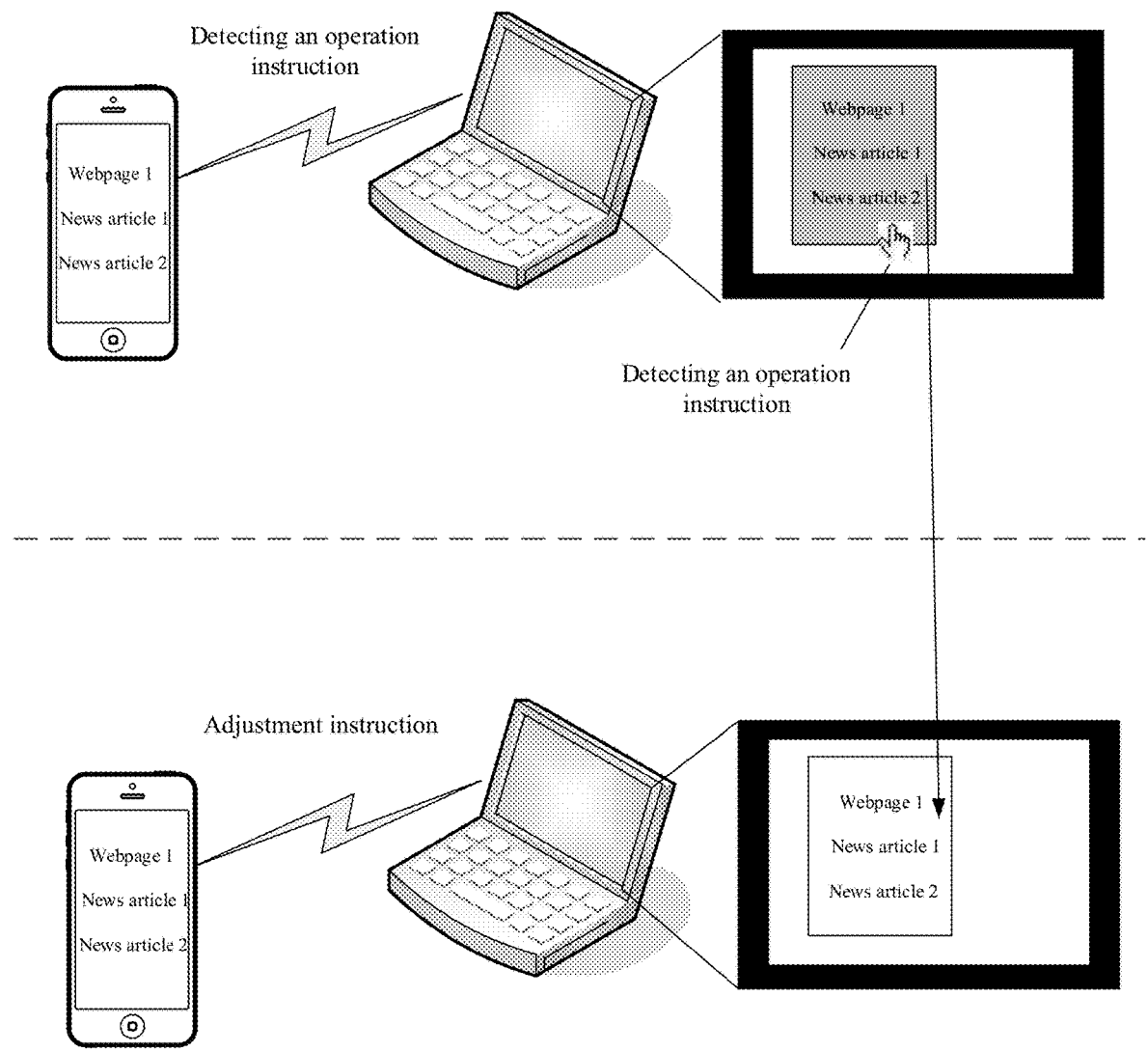
FIG. 11 illustrates a schematic diagram of another example of scenario for implementing a method for processing information in accordance with the present disclosure.

FIG. 11 illustrates a schematic diagram of another example of scenario for implementing a method for processing information in accordance with the present disclosure. As shown in the upper pane, the initial state of the sub-region of the display screen of the personal computer has a low brightness. In response to detecting a mouse click on a location within the sub-region, the operation instruction of the mouse click can be sent to the mobile phone. As shown in the lower pane, in response to receiving an adjustment instruction sent from the mobile phone, the sub-region of the display screen of the personal computer can be adjusted to a higher brightness. That is, when the user operations are performed on the side of the personal computer, the brightness of the display screen of the personal computer can be increased to facilitate the user operations.

In some embodiments, in response to receiving an adjustment instruction to decrease the brightness of the display screen of the personal computer, the brightness of the display screen of the personal computer can be deceased.

In some embodiments, the method for processing information can further include the following processes.

Based on the detection result, a time length during which the operation instruction information of the sub-region is not received can be determined.

In response to determining that the time length is greater than a second preset threshold value, the display screen of the second electronic device can be adjusted to decrease the power consumption of the display screen of the second electronic device. In some embodiments, in response to determining that the time length is greater than the second preset threshold value, the display screen of the second electronic device can be adjusted to decrease the brightness of the display screen of the second electronic device.

In some embodiments, in response to determining that the time length is greater than the second preset threshold value the brightness of the entire display screen of the second electronic device can be decreased. In some other embodiments, in response to determining that the time length is greater than the second preset threshold value, the brightness of the sub-region of the display screen of the second electronic device can be decreased.

In one example of scenario for implementing the method for processing information, the display screen of a mobile phone can be cast to a personal computer, and the mouse and keyboard of the personal computer can control the mobile phone. When the user operations are performed through the sub-region of the display screen of the personal computer, the display screen of the mobile phone can be in a minimum brightness. As such, the power consumption of the mobile phone can be decreased, and it can prevent others from accidentally seeing the user privacy from the display screen of the mobile phone.

When the user touches the display screen of the mobile phone, the display screen of the mobile phone can be lit up, and the sub-region of the display screen of the personal computer can be dimmed after a certain period of time. Further, when the user uses the mouse or keyboard of the personal computer to control the mobile phone, the display screen of the mobile phone can be dimmed to the minimum brightness after a certain period of time, and the sub-region of the display screen of the personal computer can be displayed in a normal brightness.

In some embodiments, when the connection between the first electronic device and the second electronic device is broken, the display screen of the first electronic device can be controlled to display based on the first display parameter. That is, in response to determining that the display screen of the mobile phone is not cast to the personal computer, the display screen of the mobile phone can display at a normal brightness.

Accordingly, by using the disclosed method, a connection can be established between a first electronic device and a second electronic device. The first electronic device and the second electronic device can simultaneously display the content of the first electronic device. Based on the type of the operation instruction received, the first electronic device can determine a display state of the first electronic device. As such, the first electronic device can flexibly adjust the display state according to the current operation status of the first electronic device. Therefore, when both of the first electronic device and the second electronic device are able to display the content of the first electronic device, one of the first electronic device and the second electronic device that does not receive user operation can adjust the display state to reduce the possibility of information disclosure, thereby enhancing the information security for the user.

In some other implementations, when the first electronic device and the second electronic device are simultaneously displaying the content of the first electronic device, in response to receiving a new message by the first electronic device, a message notification may pop up on the display screen of the second electronic device. However, the message notification may be automatically hidden after a certain period of time. If the message notification is only displayed in a cross screen window (e.g., the sub-region of the display screen) of the second electronic device, the message notification may be easily ignored by the user due to non-obviousness. Therefore, the user may not timely review the new message through the display screen of the second electronic device, thereby causing a delay response to the new message.

In some embodiments, determining the display state of the second electronic device based on the detection result at 1003 can include the following processes.

Based on the detection result, the second electronic device can display the message by using the second display mode. The detection result can indicate that the message is associated with the notification displayed in the sub-region of the display screen of the second electronic device, and the notification is generated by the first electronic device and is displayed on the first electronic device by using the first display mode. The first display mode can be different from the second display mode. The detailed description can be referred to process 102 described above in connection with FIG. 1.

Figure 12:
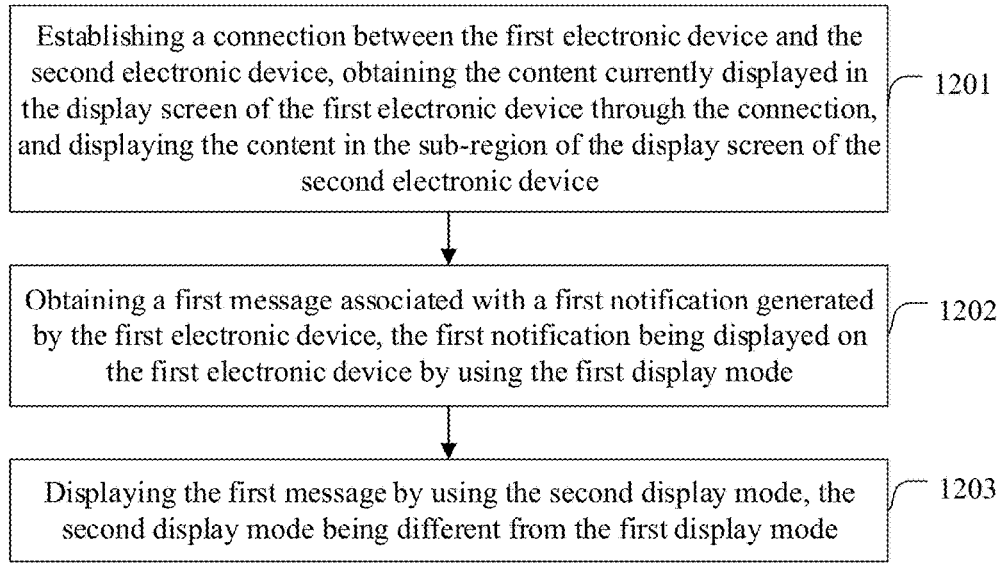
FIG. 12 illustrates a schematic flow diagram of another example of method for processing information that is implemented on the second electronic device in accordance with the present disclosure.

FIG. 12 illustrates a schematic flow diagram of another example of method for processing information that is implemented on a second electronic device in accordance with the present disclosure. As shown, the method includes the following processes.

At 1201, a connection between the first electronic device and the second electronic device is established. The content displayed on the display screen of the first electronic device can be obtained by the second electronic device, and can be displayed in the sub-region of the display screen of the second electronic device. That is, a communication link can be established between the first electronic device and the second electronic device. A cross screen display between the first electronic device and the second electronic device can be implemented based on the communication link.

At 1202, the second electronic device obtains a message associated with a notification generated by the first electronic device. The notification is displayed on the first electronic device by using the first display mode.

At 1203, the second electronic device displays the message by using the second display mode. The second display mode is different from the first display mode.

In some embodiments, by obtaining and displaying the message, the method for processing information can facilitate the user to review the notification in time. The user operations can be simplified, the intelligence level of the second electronic device can be increased, and user satisfaction can be enhanced.

In some embodiments, the method can further include the following processes.

A first operation acting on the message can be detected.

Based on the first operation, a control command can be sent to the first electronic device. The control command can be used to start an application associated with the notification by the first electronic device.

The data of the application interface of the application can be obtained. The content corresponding to the notification can be displayed in the application interface.

According to the data of the application interface, the application interface of the application can be displayed in the cross screen window.

In some embodiments, a user can make a first operation on the message. For example, the second electronic device can detect a mouse click on the message, a button operation on the message, or any other suitable input on the message. In response to detecting the first operation, the second electronic device can generate the control command, and can send the control command to the first electronic device.

In response to receiving the control command, the first electronic device can start the application associated with the notification. For example, the notification is a message notification indicating that an instant message is received. The control command can control the first electronic device to start a corresponding instant communication application. As another example, the notification is a message notification indicating that a reading application receives a new recommended article. The control command can control the first electronic device to start the corresponding reading application In response to receiving the control command, the first electronic device can start the application in the foreground. As such, the application interface of the application running on the first electronic device can be synchronized to the cross screen window on the second electronic device. Thus, the user can view the application update information of the application corresponding to the notification in the cross screen window on the second electronic device.

In some embodiments, the method can further include the following processes. A second operation acting on the notification displayed in the cross screen window can be detected. Based on the second operation, a control command can be sent to the first electronic device.

Displaying the message on the second electronic device by using the second display mode at 1203 can include displaying the message outside the cross screen window. That is, the message is displayed outside the sub-region of the display screen of the second electronic device.

The display screen of the second electronic device can include two display regions. The first display region can be the cross screen window, that is, the sub-region. The second display region can be the display region other than the sub-region, e.g., the display region outside the cross screen window.

The cross screen window of the second electronic device and the display screen of the first electronic device can simultaneously display the notification. The message can be displayed outside the cross screen window of the second electronic device.

The differences between the first display mode the second display mode can include different locations on the second electronic device at which the notification and the message can be displayed or different software systems used for controlling the displaying of the notification and the message. For example, the displaying of the notification can be controlled by the cross screen application. If the message is a system message, the displaying of the message can be controlled by the operating system of the second electronic device.

Figure 13:
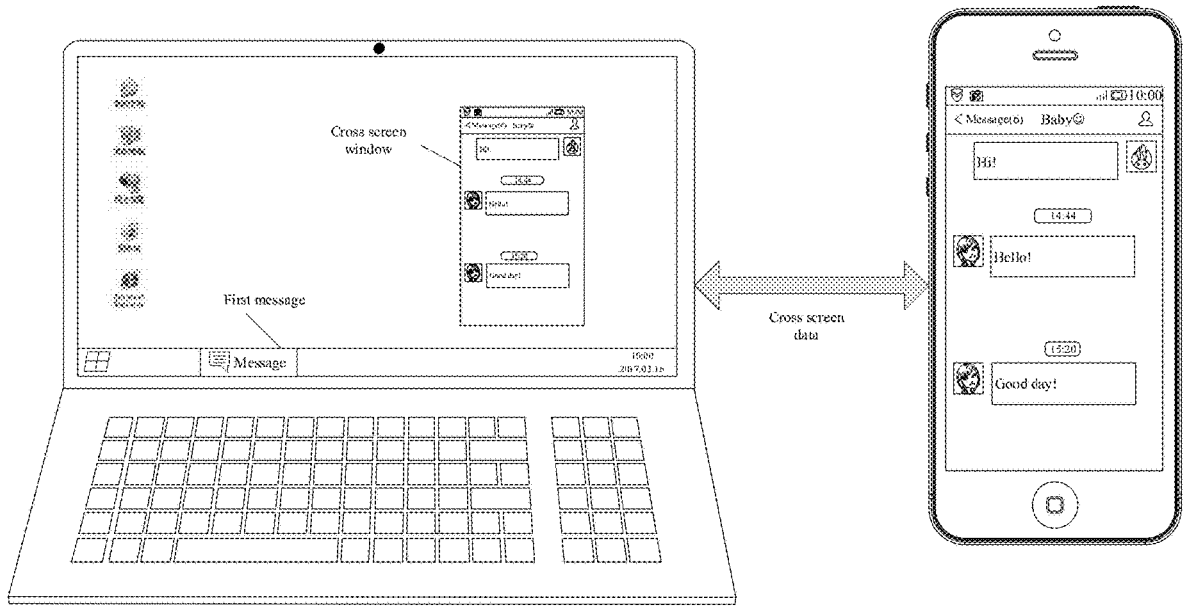
FIG. 13 illustrates a schematic diagram of an example of simultaneous display on the first electronic device and the second electronic device in accordance with the present disclosure.

FIG. 13 illustrates a schematic diagram of another example of simultaneous display of a first electronic device and a second electronic device in accordance with the present disclosure.

In the example shown in FIG. 13, the mobile phone is the first electronic device, and the laptop computer is the second electronic device. A cross screen window is displayed on the display screen of the laptop computer. The display interface of the mobile phone is displayed in the cross screen window. The notification is displayed on a taskbar of the laptop computer. That is, the message and the notification in the mobile phone interface are displayed in different regions.

The message can be any suitable message having a prompt function, such as a text message, an image message, etc.

The second electronic device can obtain the message by using any suitable methods. Two examples of the implementations are described below.

In one example, the second electronic device can receive the prompt information sent from the first electronic device, and generate the message based on the prompt information. Specifically, the first electronic device can generate a notification, and can generate prompt information after generating the notification. The prompt information can be sent to the second electronic device. As such, the second electronic device can receive the prompt information, and can generate the message based on the prompt information.

In another example, the message can be directly generated by the first electronic device. Specifically, after generating the notification, the first electronic device can generate the message corresponding to the notification. Thus, the process 1202 can further include receiving the message from the first electronic device. As such, the second electronic device does not need to generate the message.

The implementations of the method described above can be referred to the examples shown in FIGS. 8 and 9, which are not repeated herein.

Figure 14:
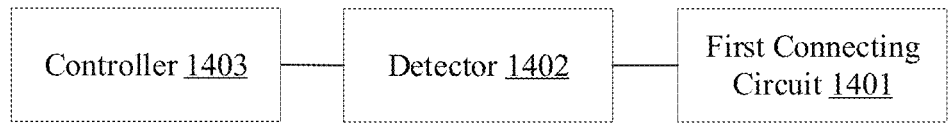
FIG. 14 illustrates a schematic structural diagram of an example of the first electronic device in accordance with the present disclosure.

FIG. 14 illustrates a schematic diagram of an example of a first electronic device in accordance with the present disclosure. As shown in FIG. 14, the first electronic device includes a first connecting circuit 1401 (also referred to as a first connecting interface), a detector 1402 (also referred to as a detecting circuit), and a controller 1403 (also referred to as a controlling circuit).

The first connecting circuit 1401 can be configured to establish a connection with a second electronic device. The content displayed on the display screen of the first electronic device can be sent to the second electronic device through the connection for presenting.

The detector 1402 can be configured to detect operation instruction information. In response to detecting the operation instruction information, the detector 1402 can determine a type of the operation instruction information. The type of the operation instruction information can include at least one of a first type of operation instruction information from the first electronic device or a second type of operation instruction information from the second electronic device.

The controller 1403 can be configured to determine a display state of the first electronic device based at least on the type of the operation instruction information.

In some embodiments, the first electronic device may be, for example, a mobile phone or a tablet. The second electronic device may be an electronic device having a display screen larger than the display screen of the first electronic device, such as, for example, a personal computer or a laptop.

In some embodiment, the connection established between the second electronic device and the first electronic device by the connecting circuit 1401 may be a wireless connection, such as a Bluetooth connection, a WIFI connection, etc. For example, as shown in FIG. 2, a mobile phone 21 is connected with a laptop computer 22 through a WIFI connection.

In some embodiments, all content currently displayed in the display region of the first electronic device can be processed to obtain image information. The image information can be sent to the second electronic device through the connection for presenting.

There are two manners to present the content on the display screen of the second electronic device. In a first manner, the content can be display in a full screen of the display screen of the second electronic device. In a second manner, the content can be display in a sub-region of the display screen of the second electronic device.

FIG. 3a illustrates a schematic diagram of one example of scenario for implementing a method for processing information in accordance with the present disclosure. FIG. 3b illustrates a schematic diagram of another example of scenario for implementing a method for processing information in accordance with the present disclosure.

As shown in FIG. 3a, the screen interface of the mobile phone is presented in a full screen on the display screen of the laptop computer. As shown in FIG. 3b, the screen interface of the mobile phone is presented in a sub-region 31 of the display screen of the laptop computer.

It is noted that, the sub-region can be flexibly configured, or can be fixedly configured. For example, the sub-region can be dragged by the user for flexible changes. As another example, the sub-region can be configured in a fixed size at a certain location of the display screen of the second electronic device.

In some embodiments, the detector 1402 can further be configured to perform the following processes.

In response to detecting the operation instruction information by using an input detector in the first electronic device, the detector 1402 can determine the type of the operation instruction information to be the first type of operation instruction information.

In response to obtaining the operation instruction information through the connection from the second electronic device, the detector 1402 can determine the type of the operation instruction information to be the second type of operation instruction information.

In some embodiments, the input detector of the first electronic device may include a touch screen, a button, etc. For example, as shown in FIG. 4, in response to detecting that a user touches the touch screen, it is determined that the operation instruction information detected by the input detector is the first type of operation instruction information.

In some embodiments, obtaining the operation instruction information through the connection from the second electronic device can include obtaining an operation instruction through an external device or a button of the second electronic device that can receive operation instructions from a user. For example, as shown in FIG. 4, in response to detecting a mouse clicking at a position of the display screen of the second electronic device, or in response to detecting a mouse clicking in the sub-region of the display screen of the second electronic device that presents the content currently displayed on the display screen of the first electronic device, it is determined that the operation instruction information obtained is the second type of operation instruction information.

In some embodiments, the controller 1403 can be further used to perform the following processes.

In response to determining that the type of the operation instruction information is the first type of operation instruction information, the controller 1403 can control the displaying of the content on the display screen of the first electronic device based on a first display parameter.

In response to determining that the type of the operation instruction information is the second type of operation instruction information, the controller 1403 can control the displaying of the content on the display screen of the first electronic device based on a second display parameter.

A power consumption for displaying the content on the display screen of the first electronic device based on the first display parameter can be larger than a power consumption for displaying the content on the display screen of the first electronic device based on the second display parameter.

The display parameter may include the brightness of the display screen. When the brightness of the display screen is high, the power consumption of the displaying of the content on the display screen is also high. When the brightness of the display screen is low, the power consumption of the displaying of the content on the display screen is also low. That is, in response to detecting an operation on the mobile phone side, the brightness of the display screen of the mobile phone can be increased, and in response to detecting an operation on the laptop computer side, the brightness of the display screen of the mobile phone can be decreased.

In some embodiments, the first electronic device can further include components, such as circuits, to perform the following processes.

In response to detecting that the display screen of the first electronic device is displaying based on the first display parameter, a time length during which no first type of operation instruction information is received can be detected.

In response to determining that the time length during which no first type of operation instruction information is received is greater than a first preset threshold value, the display screen of the first electronic device can be controlled to display based on the second display parameter.

A power consumption displaying the content on the display screen of the first electronic device based on the first display parameter can be larger than a power consumption displaying the content on the display screen of the first electronic device based on the second display parameter.

In some embodiments, if a touch operation on the touch screen of the mobile phone is not received for a time period, and a press operation on a button of the mobile phone is not received for the time period, the brightness of the touch screen of the mobile phone can be decreased. In some other embodiments, if a touch operation on the touch screen of the mobile phone is not received for a time period, the brightness of the touch screen of the mobile phone can be decreased.

Further, in some embodiments, the first display parameter and the second display parameter can correspond to different values of the brightness of the display screen. The values of the brightness of the display screen corresponding to the first display parameter and the second display parameter can be set according to actual situations. For example, the second display parameter can correspond to a minimum value of the brightness of the display screen, or can be correspond to a black screen mode. As another example, the first display parameter can correspond to a value of a normal brightness of the display screen.

For example, as shown in FIG. 5, when the mobile phone has not detected the first type of operation instruction information for about one minute, the mobile phone can be switched to the black screen mode for saving power consumption.

The first preset threshold value can be set according to actual situations. For example, the first preset threshold value can be set as one minute.

Further, in response to determining that the type of the operation instruction information is the first type of operation instruction information, an adjustment instruction can be transmitted to the second electronic device to adjust the display parameters of the second electronic device to reduce the power consumption of the second electronic device.

Alternatively, in response to determining that the type of the operation instruction information is the first type of operation instruction information, an adjustment instruction can be transmitted to the second electronic device to adjust the display parameters of the second electronic device to decrease the brightness of the sub-region of the display screen of the second electronic device.

That is, the adjustment instruction can be used to reduce the brightness of the entire display screen of the second electronic device. It can be set as default that when there is no operation performed on the second electronic device, the power consumption of the entire display screen of the second electronic device can be reduced.

For example, as shown in FIG. 6, if the user operation instructions are only received from the side of the mobile phone, an adjustment instruction is transmitted to the laptop computer after a certain length of time, such as 30 seconds. The adjustment instruction can control the laptop computer to adjust the brightness of the entire display screen from a higher value as shown in the upper pane to a lower value as shown in the lower pane.

In addition, the adjustment instruction may be used to decrease the brightness of the sub-region of the display screen of the second electronic device. As such, the power consumption of the second electronic device can be partially decreased.

For example, as shown in FIG. 7, if the user operation instructions are only received from the mobile phone, an adjustment instruction can be transmitted to the laptop computer after a certain length of time, such as 30 seconds. The adjustment instruction can control the laptop computer to adjust the brightness of the sub-region of the display screen from a higher value as shown in the upper pane to a lower value as shown in the lower pane.

In one example of scenario for implementing the method for processing information, the display screen of a mobile phone can be cast to a personal computer, and the mouse and keyboard of the personal computer can control the mobile phone. When the user operations are performed on contents in the sub-region of the display screen of the personal computer, the display screen of the mobile phone can be reduced to a minimum brightness. As such, the power consumption of the mobile phone can be decreased, and it can prevent others from accidentally seeing the user privacy from the display screen of the mobile phone.

When the user touches the display screen of the mobile phone, the display screen of the mobile phone can be lit up, and the sub-region of the display screen of the personal computer can be dimmed after a certain period of time. Further, when the user uses the mouse or keyboard of the personal computer to control the mobile phone, the display screen of the mobile phone can be dimmed to the minimum brightness after a certain period of time, and the sub-region of the display screen of the personal computer can display at a normal brightness.

In some embodiments, when the connection between the first electronic device and the second electronic device is broken, the display screen of the first electronic device can be controlled to display based on the first display parameter. That is, in response to determining that the display screen of the mobile phone is not cast to the personal computer, the display screen of the mobile phone can display at a normal brightness.

Consistent with the disclosure, a connection can be established between a first electronic device and a second electronic device. The first electronic device and the second electronic device can simultaneously display the content of the first electronic device. Based on the type of the operation instruction received, the first electronic device can determine a display state of the first electronic device. As such, the first electronic device can flexibly adjust the display state according to the current operation status of the first electronic device. Therefore, when both of the first electronic device and the second electronic device are able to display the content of the first electronic device, one of the first electronic device and the second electronic device that does not receive user operation can adjust the display state to reduce the possibility of information disclosure, thereby enhancing the information security for the user.

In some other implementations, the detector 1402 can include a second obtaining circuit. The second obtaining circuit can be configured to obtain a notification generated by the first electronic device. The notification can be the first type of operation instruction information.

The controller 1403 can include a second transmitting circuit. In response to receiving the notification, the second transmitting circuit can send preset information to the second electronic device through a communication link. The preset information can be used by the second electronic device for acquiring a message associated with the notification. The message can be displayed on the second electronic device in a second display mode.

The controller 1403 can further include a displaying component for displaying the notification on the first electronic device by using the first display mode. The first display mode can be different from the second display mode.

In some embodiments, the first connecting circuit 1401 can correspond to the communication interface of the first electronic device. The first connecting circuit 1401 can be configured to establish a communication link with the second electronic device. The first electronic device and the second electronic device can implement a cross screen application based on the communication link. The second obtaining circuit can correspond to a processor or a processing circuit of the first electronic device. For the description related to the processor or the processing circuit, reference can be made to the embodiments described above.

The second transmitting circuit can correspond to the communication interface of the first electronic device. The second transmitting circuit can be configured to send the preset information to the second electronic device through the established communication link. The preset information can include the prompt message for triggering the second electronic device to generate the message, or the message generated by the first electronic device.

In some embodiments, the first electronic device can further include a receiver (receiving circuit), a starter (starting circuit), and a second display.

The receiver can be configured to receive a control command sent by the second electronic device in response to detecting a first operation acting on the message.

The starter can be configured to start an application corresponding to the notification based on the control command.

The second display can be configured to display the content corresponding to the notification in the application interface of the application.

The second transmitting circuit can be further configured to send the data of the application interface of the application to the second electronic device. The data of the application interface of the application can be used by the second electronic device to display the application interface of the application in the cross screen window on the second electronic device.

The second display can correspond to the display screen of the first electronic device, such as, for example, a liquid crystal display screen, a projection screen, or an electronic ink display screen, etc.

In some embodiments, the second transmitting circuit can be configured to send prompt information corresponding to the message to the second electronic device. The prompt information can be used by the second electronic device to generate the message. In some other embodiments, the second transmitting circuit can be configured to send the message to the second electronic device.

Figure 15:
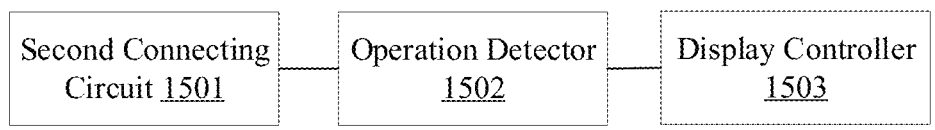
FIG. 15 illustrates a schematic structural diagram of an example of the second electronic device in accordance with the present disclosure.

FIG. 15 illustrates a schematic diagram of an example of a second electronic device in accordance with the present disclosure. As shown in FIG. 15, the second electronic device includes a second connecting circuit 1501, an operation detector 1502, and a display controller 1503.

The second connecting circuit 1501 can be configured to establish a connection between the first electronic device and the second electronic device. The second connecting circuit can be further configured to obtain the content displayed on the display screen of the first electronic through the connection. The content can be displayed on a sub-region of the display screen of the second electronic device.

The operation detector 1502 can be configured to obtain a detection result in response to detecting operation instruction information associated with an operation in the sub-region.

The display controller 1503 can be configured to determine a display state of the second electronic device based on the detection result.

In some embodiments, the first electronic device may be, for example, a mobile phone or a tablet. The second electronic device may be an electronic device having a display screen larger than the display screen of the first electronic device, such as, for example, a personal computer or a laptop.

In some embodiment, the connection established between the second electronic device and the first electronic device by the second connecting circuit 1501 may be a wireless connection, such as a Bluetooth connection, a WIFI connection, etc. For example, as shown in FIG. 2, a mobile phone 21 is connected with a laptop computer 22 through a WIFI connection.

In some embodiments, all content currently displayed in the display region of the first electronic device can be processed to obtain image information. The image information can be sent to the second electronic device through the connection for presenting.

There are two manners to present the content on the display screen of the second electronic device. In a first manner, the content can be display in a full screen of the display screen of the second electronic device. In a second manner, the content can be display in a sub-region of the display screen of the second electronic device. As shown in FIG. 3a, the screen interface of the mobile phone is presented in a full screen on the display screen of the laptop computer. As shown in FIG. 3b, the screen interface of the mobile phone is presented in a sub-region 31 of the display screen of the laptop computer.

It is noted that, the sub-region can be flexibly configured, or can be fixedly configured. For example, the sub-region can be dragged by the user for flexible changes. As another example, the sub-region can be configured in a fixed size at a certain location of the display screen of the second electronic device.

In some embodiments, the operation detector 1502 can be configured to obtain the detection result in response to receiving an operation within the sub-region of the display screen of the second electronic device. For example, in response to detecting an operation instruction through an external device of the second electronic device, the detection result can be obtained. In some other embodiments, in addition to detecting the operation instruction received through the external device, an operation instruction through a physical button of the second electronic device, such as a restart button, can be detected. In some embodiments, detecting the operation instruction information may only include detecting operation instruction information corresponding to an operation performed within the sub-region of the second electronic device.

In some embodiments, the input detector of the first electronic device may include a touch screen, a button, etc. For example, as shown in FIG. 4, in response to detecting that a user touches the touch screen, it is determined that the operation instruction information detected by the input detector is the first type of operation instruction information.

In some embodiments, obtaining the operation instruction information through the connection from the second electronic device can include obtaining an operation instruction through an external device or a button of the second electronic device that can receive operation instructions from a user. For example, as shown in FIG. 4, in response to detecting a mouse clicking at a position of the display screen of the second electronic device, or in response to detecting a mouse clicking in the sub-region of the display screen of the second electronic device that presents the content currently displayed on the display screen of the first electronic device, it is determined that the operation instruction information obtained is the second type of operation instruction information.

In some embodiments, the display controller 1503 can be configured to send operation instruction information to the first electronic device in response to detecting the operation instruction information. As such, the first electronic device can generate an adjustment instruction based on the operation instruction information.

The second electronic device can receive the adjustment instruction transmitted from the first electronic device.

Based on the adjustment instruction, the display controller 1503 of the second electronic device can adjust the display parameter to increase a power consumption of the display screen of the second electronic device.

In some other embodiments, based on the adjustment instruction, the display controller 1503 of the second electronic device can increase the brightness of the sub-region of the display screen used for presenting current content of the first electronic device.

The display parameter may include the brightness of the display screen. When the brightness of the display screen is high, the power consumption of the displaying of the content on the display screen is also high. When the brightness of the display screen is low, the power consumption of the displaying of the content on the display screen is also low. That is, in response to detecting an operation on the mobile phone side, the brightness of the display screen of the mobile phone can be increased, and in response to detecting an operation on the laptop computer side, the brightness of the display screen of the mobile phone can be decreased.

In some embodiments, before detecting the operation instruction information, the second electronic device can have a relatively low power consumption by the display screen.

That is, before detecting the operation instruction information, the second electronic device can display at a low brightness. After detecting the operation instruction information, the second electronic device can increase the brightness of the entire display screen of the second electronic device according to the adjustment command sent from the first electronic device, or can increase the brightness of the sub-region of the display screen of the second electronic device according to the adjustment command sent from the first electronic device.

For example, as shown in the upper pane of FIG. 11, the initial state of the sub-region of the display screen of the personal computer has a low brightness. In response to detecting a mouse click on a location within the sub-region, the operation instruction of the mouse click can be sent to the mobile phone. As shown in the lower pane, in response to receiving an adjustment instruction sent from the mobile phone, the sub-region of the display screen of the personal computer can be adjusted to a higher brightness. That is, when the user operations are performed on the side of the personal computer, the brightness of the display screen of the personal computer can be increased to facilitate the user operations.

The display controller 1503 can be further configured to determine, based on the detection result, a time length during which the operation instruction information of the sub-region is not received.

In response to determining that the time length is greater than a second preset threshold value, the display controller 1503 can adjust the display screen of the second electronic device to decrease the power consumption of the display screen of the second electronic device. In some other embodiments, in response to determining that the time length is greater than the second preset threshold value, the display controller 1503 can adjust the display screen of the second electronic device to decrease the brightness the display screen of the second electronic device.

In some embodiments, in response to determining that the time length is greater than the second preset threshold value the brightness of the entire display screen of the second electronic device can be decreased. In some other embodiments, in response to determining that the time length is greater than the second preset threshold value the brightness of the sub-region of the display screen of the second electronic device can be decreased.

In one example of scenario, the display screen of a mobile phone can be cast to a personal computer, and the mouse and keyboard of the personal computer can control the mobile phone. When the user operations are performed through the sub-region of the display screen of the personal computer, the display screen of the mobile phone can be in a minimum brightness. As such, the power consumption of the mobile phone can be decreased, and it can prevent others from accidentally seeing the user privacy from the display screen of the mobile phone.

When the user touches the display screen of the mobile phone, the display screen of the mobile phone can be lit up, and the sub-region of the display screen of the personal computer can be dimmed after a certain period of time. Further, when the user uses the mouse or keyboard of the personal computer to control the mobile phone, the display screen of the mobile phone can be dimmed to the minimum brightness after a certain period of time, and the sub-region of the display screen of the personal computer can be displayed in a normal brightness.

In some embodiments, when the connection between the first electronic device and the second electronic device is broken, the display screen of the first electronic device can be controlled to display based on the first display parameter. That is, in response to determining that the display screen of the mobile phone is not cast to the personal computer, the display screen of the mobile phone can display in a normal brightness.

According to the present disclosure, a connection can be established between a first electronic device and a second electronic device. The first electronic device and the second electronic device can simultaneously display the content of the first electronic device. Based on the type of the operation instruction received, the first electronic device can determine a display state of the first electronic device. As such, the first electronic device can flexibly adjust the display state according to the current operation status of the first electronic device. Therefore, when both of the first electronic device and the second electronic device are able to display the content of the first electronic device, one of the first electronic device and the second electronic device that does not receive user operation can adjust the display state to reduce the possibility of information disclosure, thereby enhancing the information security for the user.

In some other implementations, the operation detector 1502 can include an obtaining circuit. The obtaining circuit can be used to obtain a message associated with the notification. The notification can be generated by the first electronic device, and can be displayed on the first electronic device by using the first display mode.

The display controller 1503 can include a first display for displaying the message by using the second display mode. The second display mode can be different from the first display mode.

In some embodiments, the second connecting circuit 1501 and the obtaining circuit can correspond to a processor or a processing circuit. The processor can include a central processing unit, a digital signal processor, a microprocessor, a programmable array, an application processor, etc.

The processing circuit can be a dedicated integrated circuit or the like.

The processor or processing circuit can implement the functions of the second connecting circuit unit 1501 and the obtaining circuit by executing executable codes.

The first display can correspond to the display screen of the second electronic device, such as a liquid crystal display screen, a projection screen, or an electronic ink display screen, etc.

In some embodiments, the second electronic device can further include the a detector (a detecting circuit), a first transmitting circuit, and a first obtaining circuit.

The detector can be configured to detect a first operation acting on the message.

A first transmitting circuit can be used to sending a control command to the first electronic device based on the first operation. The control command can be used to control the first electronic device to start the application associated with the notification.

The first obtaining circuit can be configured to obtain the data of the application interface of the application. The content corresponding to the notification can be displayed in the application interface.

The first display can be further configured to display the application interface of the application in the cross screen window.

The first transmitting circuit can correspond to the communication interface of the second electronic device. The communication interface can be a wired interface or a wireless interface.

The first obtaining circuit can also correspond to the communication interface of the second electronic device. The first obtaining circuit can be configured to receive the data of application interface from the first electronic device.

In some embodiments, the first display can be configured to display the message outside the cross screen window.

The first display can display the application interface in the cross screen window. That is, the notification is displayed in the cross screen window. The message is displayed outside the cross screen window. Thus, the notification and the message are displayed by using different display modes. Further, the notification and the message can be displayed for different durations.

In some embodiments, the first obtaining circuit can be configured to receive prompt information from the first electronic device. The message can be generated by the second electronic device based on the prompt information. In some embodiments, the second electronic device can receive the message from the first electronic device. The message can be generated by the first electronic device based on the notification.

Figure 16:
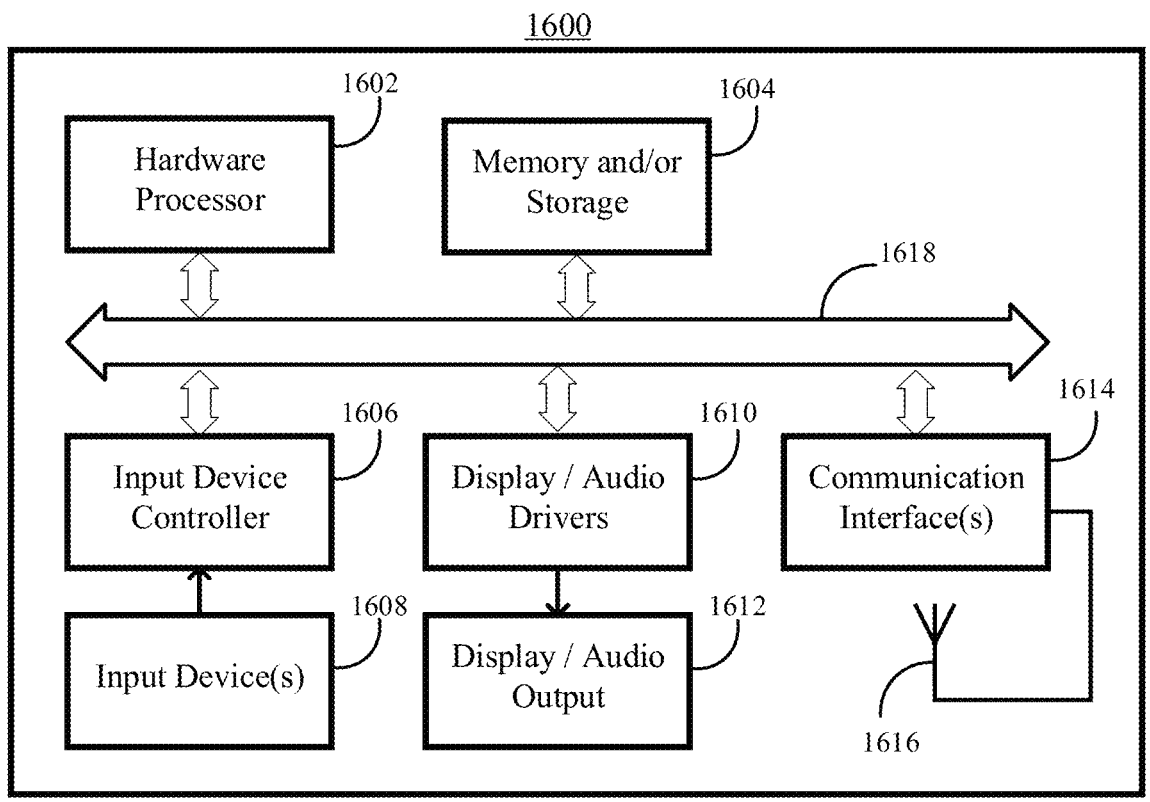
FIG. 16 illustrates a schematic hardware diagram of an example of electronic device in accordance with the present disclosure.

FIG. 16 illustrates a schematic hardware diagram of an example of electronic device in accordance with the present disclosure.

The electronic device 1600 can be either one of the first electronic device and the second electronic device described above in connection with FIGS. 14 and 15. The electronic device 1600 can be configured to perform a method for information processing consistent with the disclosure, such as one of the examples of method described above in connection with FIGS. 1-13, and/or perform any other suitable functions, such as communicating with one or more devices or severs though a communication network, receiving user request, processing and transmitting data, etc. For example, the electronic device 1600 can be implemented in a mobile phone, a tablet computer, a laptop computer, a desktop computer, a set-top box, a television, a streaming media player, a game console, a server, or another suitable device.

As shown in FIG. 16, the electronic device 1600 includes a hardware processor 1602, a memory and/or storage 1604, an input device controller 1606, an input device 1608, display/audio drivers 1610, a display and audio output circuitry 1612, communication interface(s) 1614, an antenna 1616, and a bus 1618.

The hardware processor 1602 can include any suitable hardware processors, such as a microprocessor, a microcontroller, a central processing unit (CPU), a graphics processing unit (GPU), an image signal processor (ISP), a discrete cosine transform (DCT) processor, a network processor (NP), a digital signal processor (DSP), an application specific integrated circuit (ASIC), a field-programmable gate array (FPGA), and/or other programmable logic device, discrete gate or transistor logic device, discrete hardware components.

The hardware processor 1602 can implement or execute various embodiments of the disclosure including one or more methods, processes, and/or logic diagrams. For example, the hardware processor 1602 can implement or execute various embodiments of the disclosed method for information processing described above in connection with FIGS. 1, 8, 10, and 12.

The memory and/or storage 1604 can be any suitable memory and/or storage for storing program codes, data, media content, image data, webpage URLs, channel page tables, raw data of webpage resources, information of users, and/or any other suitable content in some embodiments. For example, the memory and/or storage 1604 can include a random access memory (RAM), a double data rate synchronous dynamic random-access memory (DDR), a read only memory, a flash memory, a non-volatile memory, such as a hard disk storage, an optical media, and/or any other suitable storage device.

The input device controller 1606 can be any suitable circuitry for controlling and receiving input from one or more input devices 1608 in some embodiments.

For example, the input device controller 1606 can be circuitry for receiving an input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

The display/audio drivers 1610 can be any suitable circuitry for controlling and driving output to one or more display and audio output circuitries 1612 in some embodiments. For example, the display/audio drivers 1610 can be circuitry for driving an LCD display, a speaker, an LED, and/or any other display/audio device.

The communication interface(s) 1614 can be any suitable circuitry for interfacing with one or more communication networks. For example, the interface(s) 1614 can include a network interface card circuitry, a wireless communication circuitry, and/or any other suitable circuitry for interfacing with one or more communication networks, such as the Internet, a wide area network, a local network, a metropolitan area networks, etc.

The antenna 1616 can be any suitable one or more antennas for wirelessly communicating with a communication network in some embodiments. In some embodiments, the antenna 1616 can be omitted when not needed.

In some embodiments, the communication network can be any suitable combination of one or more wired and/or wireless networks such as the Internet, an intranet, a wide-area network (WAN), a local-area network (LAN), a wireless network, a digital subscriber line (DSL) network, a frame relay network, an asynchronous transfer mode (ATM) network, a virtual private network (VPN), a WiFi network, a WiMax network, a satellite network, a mobile phone network, a mobile data network, a cable network, a telephone network, a fiber optic network, and/or any other suitable communication network, or any combination of any of such networks.

The bus 1618 can be any suitable mechanism for communicating between two or more components of the electronic device 1600. The bus 1618 can include an address bus, a data bus, a control bus, etc. The bus 1618 is represented as a two-way arrow in FIG. 16, but it does not mean that it is only one type bus or only one bus.

The processes in the disclosed method in various embodiments can be executed by a hardware decoding processor, or by a decoding processor including a hardware module and a software module. The software module may reside in any suitable storage/memory medium, such as a random access memory, a flash memory, a read-only memory, a programmable read-only memory, an electrically erasable programmable memory, a register, etc. The storage medium can be located in the memory and/or storage 1604. The hardware processor 1602 can implement the disclosed method by combining the hardware and the information read from the memory and/or storage 1604.

It should be noted that, the flowcharts and block diagrams in the figures illustrate various embodiments of the disclosed method, media and system, as well as architectures, functions and operations that can be implemented by a computer program product. In this case, each block of the flowcharts or block diagrams may represent a module, a code segment, or a portion of program code. Each module, each code segment, and each portion of program code can include one or more executable instructions for implementing predetermined logical functions.

It should also be noted that, in some alternative implementations, the functions illustrated in the blocks be executed or performed in any order or sequence not limited to the order and sequence shown and described in the figures. For example, two consecutive blocks may actually be executed substantially simultaneously where appropriate or in parallel to reduce latency and processing times, or even be executed in a reverse order depending on the functionality involved in. Furthermore, FIGS. 1, 8, 10 and 12 are provided as an example only. At least some of the processes shown in FIGS. 1, 8, 10 and 12 may be performed in a different order than represented, performed concurrently, or altogether omitted.

It should also be noted that, each block in the block diagrams and/or flowcharts, as well as the combinations of the blocks in the block diagrams and/or flowcharts, can be realized by a dedicated hardware-based system for executing specific functions, or can be realized by a dedicated system combined by hardware and computer instructions.

The disclosure also provides a computer software product that includes computer-readable storage medium storing program codes. The program code includes instructions for performing the disclosed method. The computer software product can be stored in a storage medium, including multiple instructions to instruct a computer device, such as a hardware processor, a personal computer, a server, or a network equipment, to perform all or part of a method consistent with the disclosure, such as one of the above-described methods. The aforementioned storage media can include: U disk, removable hard disk, read only memory (ROM), random access memory (RAM), floppy disk, CD-ROM, or any other suitable medium that can store program codes.

The provision of the examples described herein (as well as clauses phrased as "such as," "e.g.," "including," or the like) should not be interpreted as limiting the disclosure to the specific examples; rather, the examples are intended to illustrate only some of many possible aspects.

In this disclosure, relational terms such as first and second are merely used to distinguish one entity or operation from another entity or operation without necessarily requiring or implying any such actual relationship or order between the entities or the operations. Moreover, the terms "comprise," "include," or any other variations thereof are intended to cover a non-exclusive inclusion such that a process, method, article, or apparatus that includes a list of elements includes not only those elements but also other elements that are not listed or that are inherent to such process, method, article, or device. Without further limitations, an element following "including a . . . " does not exclude the existence of additional identical or similar elements in the process, method, article, or apparatus that includes the element.

Although the present disclosure has been described and illustrated in the foregoing illustrative embodiments, it is understood that the present disclosure has been made only by way of example, and that numerous changes in the details of embodiment of the present disclosure can be made without departing from the spirit and scope of the present disclosure. Features of the disclosed embodiments can be combined and rearranged in various ways. Without departing from the spirit and scope of the present disclosure, modifications, equivalents, or improvements to the present disclosure are conceivable to those skilled in the art and are intended to be encompassed within the scope of the present disclosure.

What is claimed is:

1. An information processing method comprising:
    sending, by a first electronic device, content displayed on the first electronic device to a second electronic device through a communication connection between the first electronic device and the second electronic device;
    detecting operation instruction information, the operation instruction information including a notification generated by the first electronic device; and
    determining a display state of the first electronic device based at least on the operation instruction information, including:
        determining to display the notification on the first electronic device according to a first display mode; and
        sending preset information from the first electronic device to the second electronic device through the communication connection, the preset information causing the second electronic device to obtain a message associated with the notification and to display the message on the second electronic device according to a second display mode, and the first display mode being different from the second display mode.

2. The method of claim 1, further comprising:
    receiving a control command transmitted from the second electronic device, the control command being generated by the second electronic device in response to detecting an operation acting on the message;
    starting an application corresponding to the notification based on the control command;
    displaying the notification in an application interface of the application; and
    sending data of the application interface to the second electronic device, the second electronic device using the data of the application interface to display the application interface in a cross screen window of a cross screen application of the second electronic device.

3. The method of claim 1, wherein sending the preset information from the first electronic device to the second electronic device includes sending prompt information corresponding to the message from the first electronic device to the second electronic device, the prompt information causing the second electronic device to generate the message.

4. The method of claim 1, wherein sending the preset information from the first electronic device to the second electronic device includes sending the message from the first electronic device to the second electronic device.

5. The method of claim 1, wherein determining the display state of the first electronic device further includes:
    in response to detecting the operation instruction information through an input detector of the first electronic device, controlling a display screen of the first electronic device to display based on a first display parameter; and
    in response to detecting the operation instruction information through the communication connection from the second electronic device, controlling the display screen of the first electronic device to display based on a second display parameter,
    wherein a power consumption of the display screen based on the first display parameter is larger than a power consumption of the display screen based on the second display parameter.

6. The method of claim 5, further comprising:
    in response to the display screen displaying based on the first display parameter, detecting a time duration that no operation instruction information is detected through the input detector; and
    in response to determining that the time duration is longer than a preset threshold, controlling the display screen to display based on the second display parameter.

7. The method of claim 5, wherein:
    the first display parameter includes a first brightness value,
    the second display parameter include a second brightness value, and
    the first brightness value is larger than the second brightness value.

8. The method of claim 5, wherein controlling the display screen based on the first display parameter further includes:
    sending an adjustment instruction to the second electronic device to adjust a display parameter of the second display screen to reduce a power consumption of the second display screen.

9. An information processing method comprising:
    receiving content currently displayed on a first electronic device through a communication connection between the first electronic device and a second electronic device;
    displaying, by the second electronic device, the content in a sub-region of a display screen of the second electronic device;
    detecting operation instruction information directed to the sub-region, the operation instruction information including a message associated with a notification generated by the first electronic device and displayed on the first electronic device according to a first display mode; and
    determining to display the message on the second electronic device according to a second display mode different from the first display mode.

10. The method of claim 9, further comprising:
detecting an operation acting on the message;
sending a control command from the second electronic device to the first electronic device based on the operation, the control command causing the first electronic device to start an application corresponding to the notification;
obtaining data of an application interface of the application from the first electronic device; and
displaying the application interface in the sub-region based on the data of the application interface.

11. The method of claim 9, wherein determining to display the message on the second electronic device according to the second display mode includes:
displaying the message on the display screen outside the sub-region.

12. The method of claim 9, further comprising:
receiving prompt information transmitted from the first electronic device; and
generating the message based on the prompt information.

13. The method of claim 9, further comprising:
receiving the message transmitted from the first electronic device, the message being generated by the first electronic device based on the notification.

14. The method of claim 9, further comprising:
sending the operation instruction information to the first electronic device;
receiving an adjustment instruction transmitted from the first electronic device generated based on the operation instruction information; and
adjusting a display parameter of the second display screen to increase a power consumption of the second display screen or to reduce a brightness level of the cross screen window on the second screen.

15. The method of claim 9, further comprising:
sending the operation instruction information to the first electronic device;
receiving an adjustment instruction transmitted from the first electronic device generated based on the operation instruction information; and
adjusting a display parameter of the second display screen to increase a brightness level of the sub-region.

16. The method of claim 9, further comprising:
determining a time duration that no operation instruction information is detected; and
in response to determining that the time duration is longer than a preset threshold, adjusting a display parameter of the second display screen to reduce a power consumption of the second electronic device.

17. The method of claim 9, further comprising:
determining a time duration that no operation instruction information is detected; and
in response to determining that the time duration is longer than a preset threshold, adjusting a display parameter of the second display screen to reduce a brightness of the sub-region.

18. An electronic device comprising:
a connecting circuit, wherein the connecting circuit establishes a communication connection between the electronic device and another electronic device and sends content displayed on the electronic device to the another electronic device through the communication connection;
a detector coupled to the connecting circuit, wherein the detector detects operation instruction information; and
a controller coupled to the detector, wherein the controller:
in response to detecting the operation instruction information through the detector, controls a display screen of the electronic device to display based on a first display parameter; and
in response to detecting the operation instruction information through the communication connection from the another electronic device, controls the display screen of the electronic device to display based on a second display parameter,
wherein a power consumption of the display screen based on the first display parameter is larger than a power consumption of the display screen based on the second display parameter.

* * * * *